(12) United States Patent
Baek et al.

(10) Patent No.: US 10,125,948 B2
(45) Date of Patent: *Nov. 13, 2018

(54) OPTICAL MEMBER AND LIGHTING DEVICE USING THE SAME

(71) Applicant: LG INNOTEK CO., LTD., Seoul (KR)

(72) Inventors: Seung Jong Baek, Seoul (KR); Jin Su Kim, Seoul (KR); Dong Hyun Lee, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,986

(22) Filed: Jul. 17, 2017

(65) Prior Publication Data

US 2017/0314766 A1    Nov. 2, 2017

Related U.S. Application Data

(63) Continuation of application No. 14/582,742, filed on Dec. 24, 2014, now Pat. No. 9,732,939.

(30) Foreign Application Priority Data

Dec. 27, 2013    (KR) .................. 10-2013-0164890

(51) Int. Cl.
   *F21V 7/04*       (2006.01)
   *F21S 10/00*     (2006.01)
   (Continued)

(52) U.S. Cl.
   CPC ............ *F21V 7/048* (2013.01); *F21S 10/005* (2013.01); *G02B 5/09* (2013.01); *G02B 6/0036* (2013.01);
   (Continued)

(58) Field of Classification Search
   CPC ..... G02B 6/0036; G02B 6/0038; F21S 10/005
   See application file for complete search history.

(56) References Cited

U.S. PATENT DOCUMENTS 2,756,326 A    7/1956    Franck
5,584,556 A    12/1996   Yokoyama et al.
(Continued)

FOREIGN PATENT DOCUMENTS

CN    102062334    5/2011
EP    2 592 469    5/2013
(Continued)

OTHER PUBLICATIONS

European Search Report dated Sep. 7, 2017 issued in Application No. 14874856.9.
(Continued)

*Primary Examiner* — Alexander Garlen
(74) *Attorney, Agent, or Firm* — Ked & Associates, LLP

(57) ABSTRACT

Provided are an optical member capable of implementing optical images having desired shapes through a pattern design, and a lighting device using the optical member, the optical member including: a base substrate; multiple patterns sequentially arranged on a first surface of the base substrate and having inclined surfaces with an inclination angle with respect to the first surfaces; and a reflective portion on the base substrate or the multiple patterns, wherein the multiple patterns implement a line shaped beam of a first path crossing at right angles to respective pattern extension directions of the multiple patterns by guiding a first incident beam into a first surface direction toward which the first surface looks or a second surface direction toward which a second surface of the base substrate opposite to the first surface looks, through refraction or reflection from the inclined surfaces.

18 Claims, 14 Drawing Sheets

(51) Int. Cl.
*G02B 5/09* (2006.01)
*F21V 8/00* (2006.01)
F21Y 115/10 (2016.01)
F21Y 105/00 (2016.01)

(52) U.S. Cl.
CPC ....... *F21Y 2105/00* (2013.01); *F21Y 2115/10* (2016.08); *G02B 6/0038* (2013.01)

(56) References Cited

U.S. PATENT DOCUMENTS

| | | |
|---|---|---|
| 2006/0104092 A1 | 5/2006 | Feng et al. |
| 2007/0263137 A1 | 11/2007 | Shigeta et al. |
| 2010/0073955 A1 | 3/2010 | Cornelissen et al. |
| 2013/0264590 A1* | 10/2013 | Oh .......................... H01L 33/48 257/88 |
| 2013/0272028 A1* | 10/2013 | Hong ................... G02B 6/0035 362/612 |
| 2013/0328090 A1 | 12/2013 | Park et al. |
| 2013/0336005 A1 | 12/2013 | Chen et al. |
| 2014/0043846 A1* | 2/2014 | Yang .................... G02B 6/0035 362/606 |
| 2014/0043854 A1* | 2/2014 | Yang ....................... F21V 13/12 362/612 |

FOREIGN PATENT DOCUMENTS

| | | |
|---|---|---|
| EP | 2 650 590 | 10/2013 |
| JP | 2013-251082 | 12/2013 |
| WO | WO 2013/133603 | 9/2013 |

OTHER PUBLICATIONS

U.S. Non-Final Office Action dated Apr. 14, 2016 issued in co-pending U.S. Appl. No. 14/582,742.
U.S. Final Office Action dated Dec. 14, 2016 issued in co-pending U.S. Appl. No. 14/582,742.
Chinese Office Action dated Mar. 30, 2017 issued in Application No. 201480076520.9 (with English Translation).
U.S. Notice of Allowance dated Apr. 12, 2017 issued in co-pending U.S. Appl. No. 14/582,742.

* cited by examiner

FIG. 17
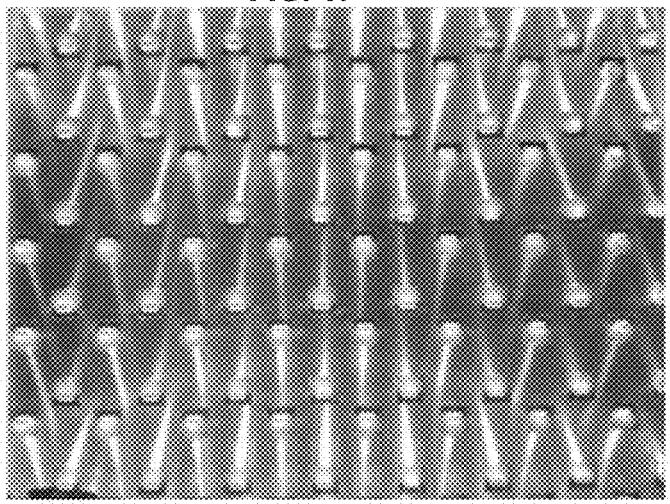
(a)
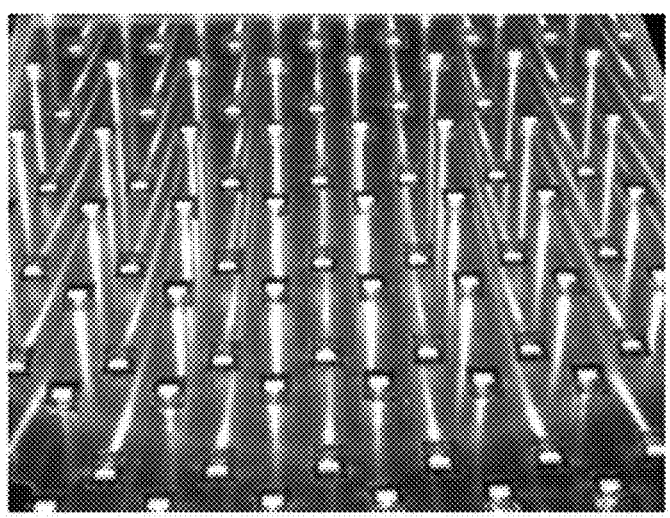
(b)
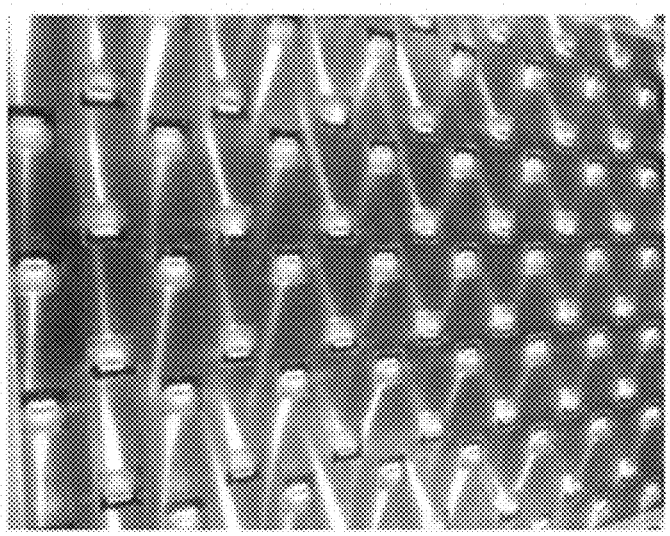
(c)

OPTICAL MEMBER AND LIGHTING DEVICE USING THE SAME

CROSS-REFERENCE TO RELATED APPLICATIONS

This application is a Continuation Application of prior U.S. patent application Ser. No. 14/582,742 filed Dec. 24, 2014, which claims priority under 35 U.S.C. § 119 to Korean Application No. 10-2013-0164890 filed on Dec. 27, 2013, in the Korean Intellectual Property Office, whose entire disclosure is hereby incorporated by reference.

BACKGROUND

1. Field

Embodiments of the present disclosure relate to an optical member capable of implementing an optical image having a desired shape by controlling an optical path, an optical width and luminous intensity through a pattern design through a pattern design, and a lighting device using the same.

2. Background

In general, a lighting device is a device used for lightening a dark place using various light sources. The lighting device is used to shine a beam at a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from LED light sources to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express the atmosphere in a desired shape or color or an optical image, a light device having a simple structure, which is easy to install or maintain and manage, has been required.

BRIEF DESCRIPTION OF THE DRAWINGS

The embodiments will be described in detail with reference to the following drawings in which like reference numerals refer to like elements wherein:

FIG. 17 is an operational status view of the lighting device according to another embodiment of the present disclosure;

DETAILED DESCRIPTION DISCLOSURE

Figure 1:
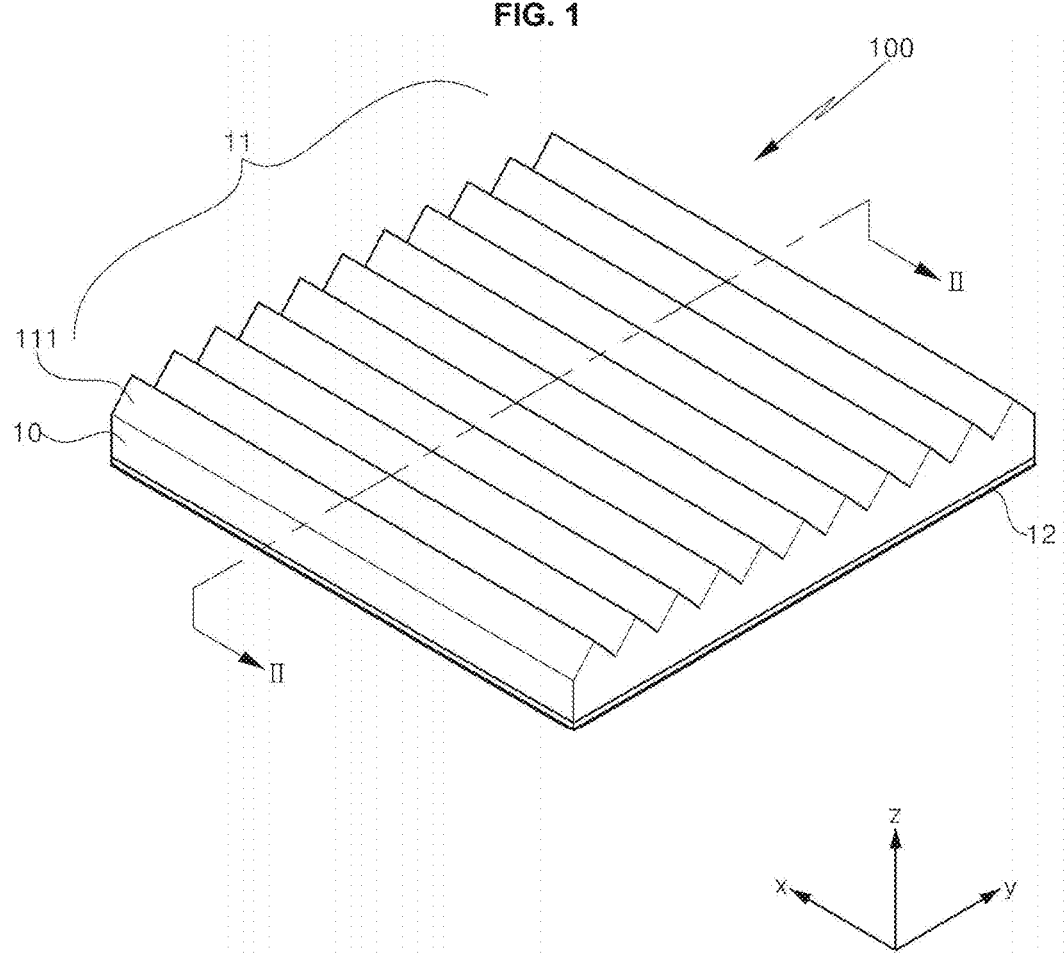
FIG. 1 is a perspective view of an optical member according to an embodiment of the present disclosure.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals.

Figure 2:
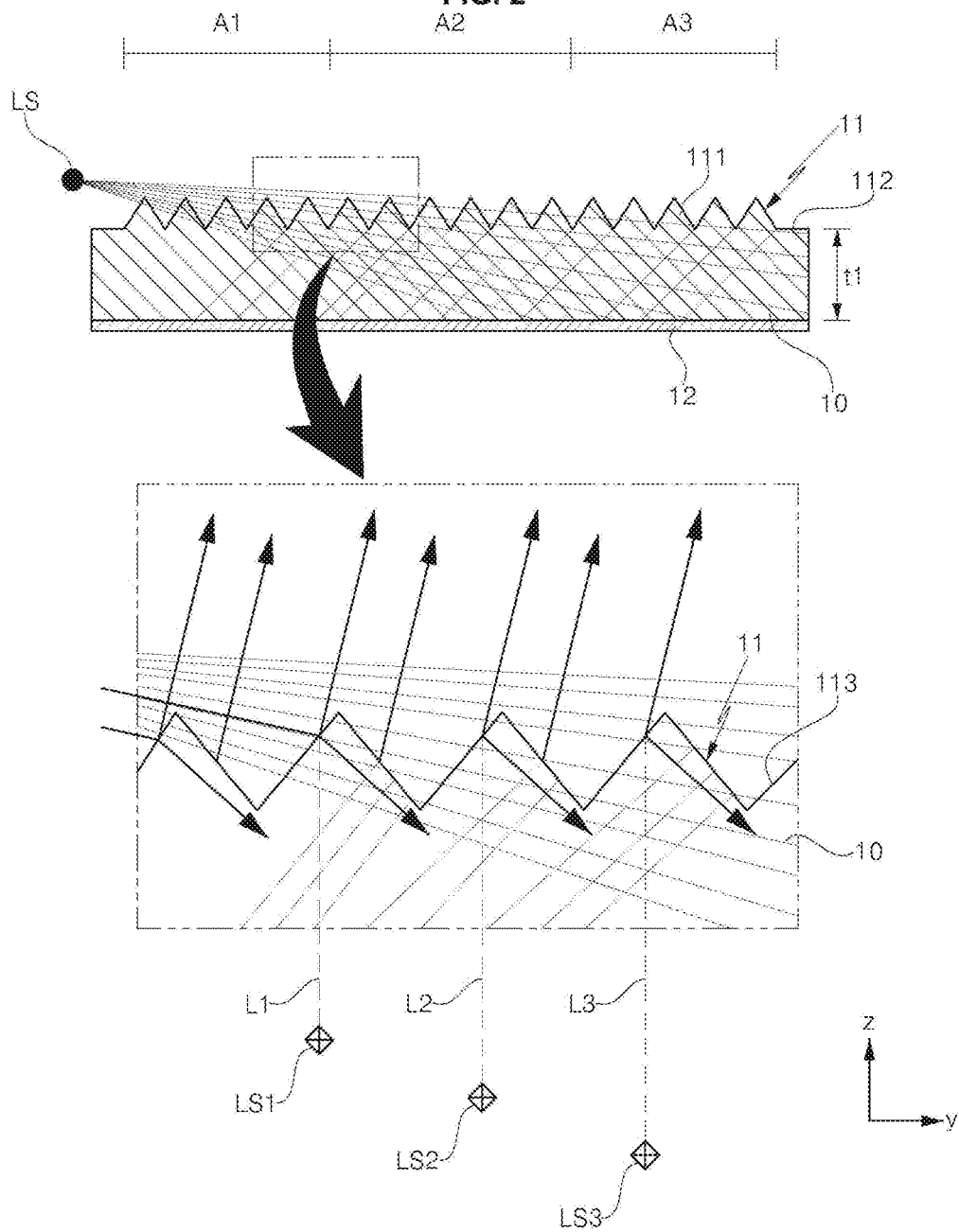
FIG. 2 is a cross-sectional view and a partially enlarged view of the optical member of FIG. 1.

FIG. 1 is a perspective view of an optical member according to an embodiment of the present disclosure. FIG. 2 is a cross-sectional view and a partially enlarged view of the optical member of FIG. 1.

Referring to FIGS. 1 and 2, an optical member 100 according to the present embodiment is configured to include: a base substrate 10; a three-dimensional effect forming portion 11; and a reflective portion 12. The three-dimensional effect forming portion 11 includes multiple patterns 111 sequentially arranged on a first surface of the base substrate 10, and each of the multiple patterns has an inclined surface 113 having an inclination angle with respect to a first surface.

The base substrate 10 is formed with a transparent substrate. The base substrate 10 may be made of a material having a haze of 2% or less. Also, it is preferable that a light transmittance of the base substrate 10 be 80% or more, but is not limited thereto. For example, the light transmittance of the base substrate 10 may be selected from the range of about 60% or more according to a desired shape upon implementing optical images of a line shaped beam, a three-dimensional effect beam or a line shaped beam with a three-dimensional effect. When the light transmittance of the base substrate 10 is smaller than 60%, it may be difficult to properly express a line shaped beam or a three-dimensional effect beam.

The base substrate 10 has the first surface and a second surface opposite to the first surface. When the base substrate 10 is provided in a plate or film form, the first surface and the second surface refer to two surfaces (both surfaces) roughly parallel to each other having a relatively wide area compared to the other surfaces of the base substrate 10. The first surface may be referred to as a first main surface or a pattern arrangement surface 112.

The base substrate 10 may be made of a polymeric material such as resin, glass or the like. A material of base substrate 10 may be a thermoplastic polymer or a photocurable polymer. Also, the material of the base substrate 10 may be polycarbonate, polymethylmethacrylate, polystyrene or polyethylene terephthalate, but is not limited thereto.

A refractive index of the base substrate 10 may range from about 1.30 to 1.80. Also, according to some embodiments, a refractive index of the base substrate 10 may range from about 1.80 to 2.5. In this case, each of the inclined surfaces 113 of the multiple patterns 111 may be provided so as to have a fixed inclination angle according to each refractive index of the base substrate 10. The inclined angle may be an angle formed by the pattern arrangement surface 112 of the base substrate 10 and the inclined surface 11, or an angle formed by a straight line or a plane being at right angles to the pattern arrangement surface 112 and the inclined surface 113.

The multiple patterns 111 of the three-dimensional effect forming portion 11 implement a line shaped beam of a first path being at right angles to respective pattern extension directions (x-directions) of the multiple patterns by guiding a first incident beam into a first surface direction toward which the first surface of the base substrate 10 looks, or a second surface direction toward which the second surface looks by using refraction or reflection of the respective inclined surfaces 113 of the multiple patterns.

Here, the aforesaid inclined surface 113 is provided so as to substantially limit spread reflection of the incident beam and to have little light returning to an incident angle. That is, the inclined surface 113 is provided so as to substantially guide the incident beam into a predetermined direction using refraction and regular reflection of the incident beam.

The aforesaid line shaped beam refers to a beam guided and concentrated so that light irradiated to a hemispherical area including the three-dimensional effect forming portion 11 can have a fixed width (optical width) in the first path and can form a bright portion (a line shaped bright portion) that has a length longer than the optical width and is brighter beyond dozens of times compared to peripheral areas. The guided and concentrated beam means that the light of a predetermined optical path according to a position of a standard point or an observing point in a light effective area of the light sources is relatively clearly seen compared to the light of peripheral areas. A length direction of the line shaped beam may be parallel to a y-direction. That is, in the present embodiment, the first path may refer to an optical path of light traveling in the y-direction.

Also, the first surface direction and the second surface direction described above refer to two directions toward opposite sides to each other in the thickness direction of the base substrate 10 with the base substrate 10 therebetween. That is, the first surface direction may refer to an arbitrary direction toward an upper space (an upper part of the ground) facing the first surface in the first surface, and the second surface direction may refer to a direction toward a lower space (a lower part of the ground) facing the second surface in the second surface.

Also, the pattern extension direction described above are a direction in which a specific straight line on the inclined surface extends, or a direction in which a specific tangent line in contact with a curved line on the inclined surface extends. The pattern extension direction is designed so as to limit and guide an optical path of light emitted from the light source for irradiating the light to the multiple patterns 111 into a desired direction, namely, the first path. That is, the pattern extension direction of each of the multiple patterns may be provided to extend in a direction that is roughly parallel to the pattern arrangement surface and meets at right angles to the first path.

The reflective portion 12 is provided on the second surface of the base substrate 10. The reflective portion 12 may be provided so as to completely or partially prevent an incident beam inside the base substrate 10 from being irradiated to the outside of the second surface by passing through the second surface. That is, the reflective portion 12 That is, the reflective portion 12 is operated to reflect internal light of an incidence angle capable of passing through the second surface of the base substrate 10 by being refracted and reflected by the multiple patterns 111 so that the internal light can travel to the pattern arrangement surface 112 of the base substrate 10 where the multiple patterns 111 are positioned.

The reflective portion 12 may be formed of a coating layer or a film having a refractive function. Ag, Al and the like may be used as a material of the reflective portion 12.

In a case where the reflective portion 12 is used, the visibility of a line shaped beam may be improved when implementing the line shaped beam having a three-dimensional effect through the three-dimensional effect forming portion 11. Also, according to a pattern design of the reflective portion 12, optical images of the line shaped beam may be variously changed.

The line shaped beam with the three-dimensional effect will be described in greater detail with reference to FIG. 2 as follows.

As illustrated in FIG. 2, the multiple patterns 111 are operated as indirect light sources in which optical paths become longer in order as a distance from the light source LS increases gradually, thereby creating a three-dimensional effect beam in a thickness direction (z-direction) of the base substrate 10. The thickness direction of the base substrate 10 may be a direction which meets at right angles to the pattern extension direction (x-direction) and the first direction (y-direction).

In other words, when the multiple patterns 111 include first patterns, second patterns and third patterns in a first area A1, a second area A2 and a third area A3 sequentially arranged from the light source LS, a second optical path of the second patterns is longer than a first optical path of the first patterns and is shorter than the third optical path of the third patterns. a second distance L2 from a second dummy light source LS2 of the light sources by inclined surfaces of the second patterns to the inclined surfaces of the second patterns is longer than a first distance L1 from a first dummy light source LS1 of the light sources by inclined surfaces of the first patterns to the inclined surfaces of the first patterns, and is shorter than a third distance L3 from a third dummy light source LS3 of the light sources by inclined surfaces of the third patterns to the inclined surfaces of the third patterns. According to such a configuration, the multiple pattern 111 implement three-dimensional effect beams showing a form in which an optical path increases as a distance from the light source increases gradually in a length direction of the line shape beam, and accordingly, as viewed from an arbitrary point (a standard point or an observing point) in a direction roughly vertical to the first surface or the pattern arrangement surface, the distance from the light sources increases as the optical path increases gradually.

The second patterns may be patterns positioned right after the first patterns on the pattern arrangement surface 112 as viewed from the light source LS or may be patterns positioned with the first patterns and other patterns in a predetermined number therebetween. Similarly, the third patterns may be patterns positioned right after the second patterns on the pattern arrangement surface as viewed from the light source LS, or may be patterns positioned with the second patterns and other patterns in a predetermined number therebetween.

Also, the aforesaid three-dimensional effect beam may refer to an optical image having a form (perceptional depth) in which a line-shape beam of a predetermined optical path (the first path) gradually enters the base substrate 10, namely, from the first surface of the base substrate 10 toward the second surface of the base substrate 10, as viewed from the first surface direction or the second surface direction. Furthermore, the three-dimensional effect beam may be one example of a line-shaped beam and may be another name for a specific optical image of the line-shaped beam.

Also, according to the present embodiment, the multiple patterns 111 are provided by removing a part of the first surface of the base substrate 10, but the present disclosure is not limited to the configuration. That is, according to some embodiments, the multiple patterns 111 may be provided by a separate pattern layer disposed on the first surface of the base substrate 10. When the multiple patterns 111 intended for guiding an incident beam into the first surface direction or the second surface direction by refracting and reflecting the incident beam via the inclined surface 113 having the predetermined surface roughness are used, an optical path, an optical width and luminous intensity of the incident beam can be controlled, and accordingly, the optical images having desired shapes of line shaped beam, three-dimensional effect beam or line shaped beams with a three-dimensional effect beam having desired shapes can be implemented.

In order to implement optical images of the line shaped beams with a three-dimensional effect through a pattern design, the inclined surface 113 of each of the multiple patterns 111 may be provided as a mirror-like finishing surface or a precision processing surface. That is, the inclined surface 113 has a surface roughness beyond a fixed standard as a smooth surface.

In the present embodiment, even though there is a slight difference according to each processing method, the inclined surface 113 may have a roughly center line average roughness or an arithmetic mean roughness Ra of 0.02 or less, and a maximum height roughness Rmax of 0.3 or less. According to some embodiments, the surface roughness of the inclined surface 113 may be a ten point median height Rz of 0.8 or less. Here, the unit of roughness may be μm, and a standard length may be 0.25 mm.

The configuration of the inclined surface 113 is intended to secure a reflectance of the inclined surface in a range beyond a predetermined value. When the surface roughness shows a larger surface roughness than the value described above, it is difficult to properly implement a line shaped beam due to the scattering of light or light beyond a fixed amount returning from the inclined surface to the light sources.

According to the optical member 100 of the present embodiment, a thickness t1 of the base substrate 10 may be about 250 μm or more and about 500 μm or less. In this case, the optical member 100 has a plate form which makes it difficult to wind the optical member on a roll. Also, the thickness t1 of the base substrate 10 may be about tens of μm or more and about 250 μm or less. In this case, the optical member 10 has a film form which makes it possible to wind the optical member on a roll. When the thickness of the base substrate 10 is smaller than about 10 μm, it may be difficult to form the multiple patterns directly on one surface of the base substrate 10, and when the thickness of the base substrate 10 is thicker than 500 μm, it may be difficult to implement a line shaped beam and costs for production and handling may be increased.

Figure 3:
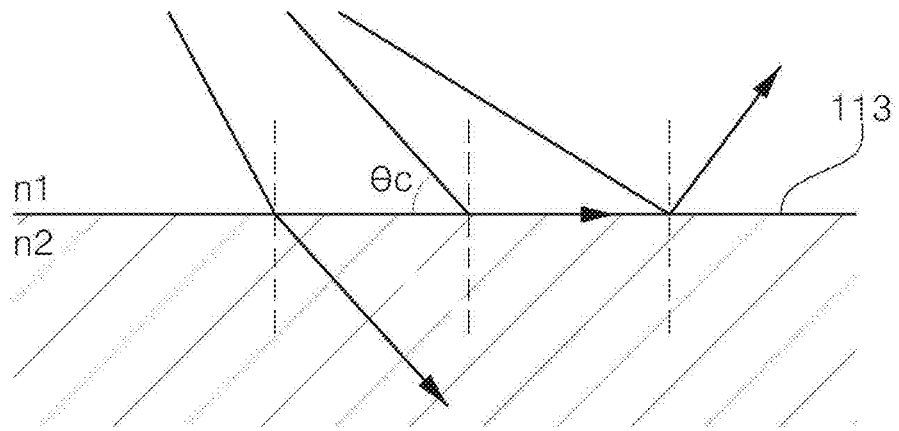
FIG. 3 is a view for explaining the principles of refraction and reflection of an incident beam generated from patterns of the optical member of FIG. 1.

FIG. 3 is a view for explaining the principles of refraction and reflection of an incident beam generated from patterns of the optical member of FIG. 1.

Referring to FIG. 3, with regard to the multiple patterns of the optical member according to the present embodiment, the inclined surface 113 of each of the multiple patterns refracts and reflects an incident beam according to an incidence angle of the incident beam.

That is, when a refractive index of atmosphere or air is n1, and a refractive index is n2, light in the base substrate traveling to the atmosphere of the outside is refracted or reflected according to an inclination angle of the beam on the inclined surface 113 of each of the patterns.

For example, when the inclination angle is identical to a predetermined critical angle θc of total reflection, the incident beam travels along the inclined surface 113, and when the inclination angle is smaller than the critical angle θc of total reflection, the incident beam is refracted at a larger angle than the inclination angle from the inclined surface 113 according to the refractive index n2 of the base substrate, thereby traveling inside the base substrate. When the inclination angle is larger than the critical angle θc of total reflection, the incident beam is reflected from the inclined surface 113, thereby traveling to an upper side direction (corresponding to the first surface direction) toward which the pattern arrangement surface looks.

Of course, similarly, the light traveling from the inside of the base substrate to the outside is also refracted from the inclined surface 113 according to the inclination angle of the light from the inclined surface 113 of each of the patterns, and travels to the outside or is reflected from the inclined surface 113 so as to travel in the inside of the base substrate 10.

Figure 4:
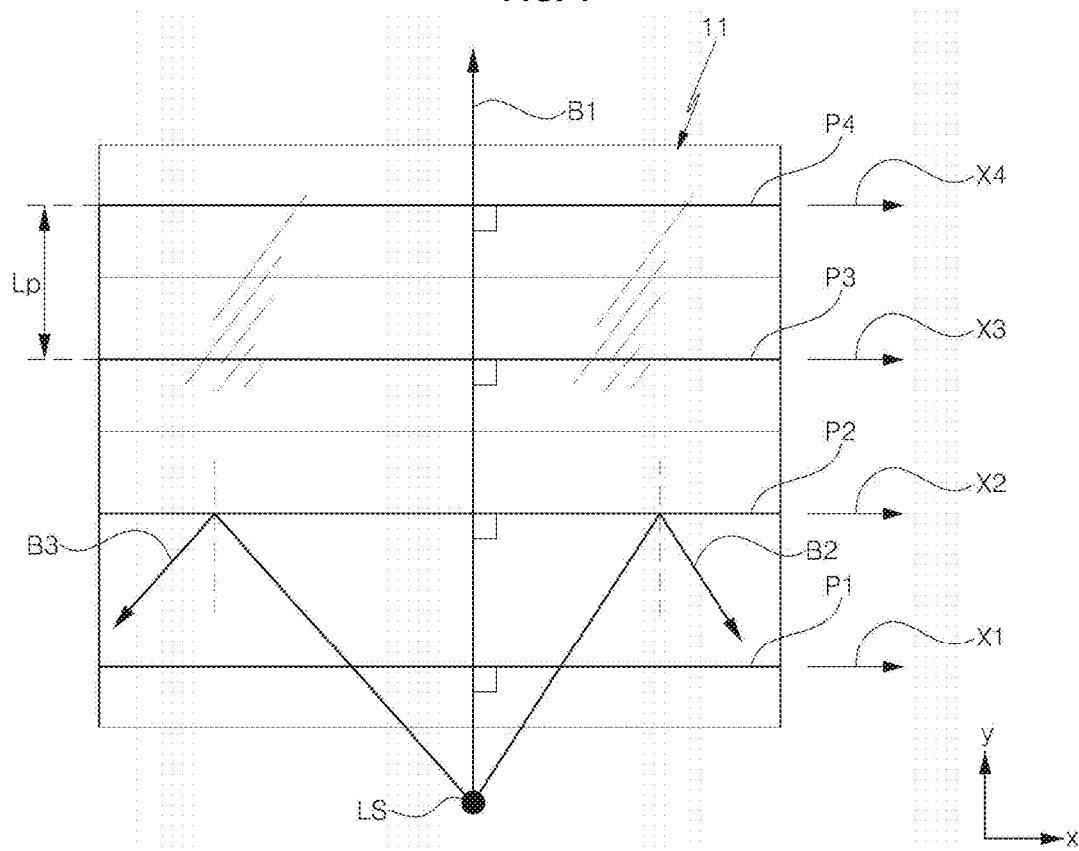
FIG. 4 is a view for explaining the principles of generation of a line shaped beam using the optical member of FIG. 1.

FIG. 4 is a view for explaining the principles of generation of a line shaped beam using the optical member of FIG. 1. FIG. 4 corresponds to a partially enlarged plan view of the multiple patterns 111 with regard to the pattern arrangement surface 112 of the base substrate 10 of FIG. 2 as viewed from above.

Referring to FIG. 4, with regard to the three-dimensional effect forming portion 11 provided on the first surface of the base substrate, when the multiple patterns P1, P2, P3, P4 are sequentially arranged in the y-direction with respect to the light source LS, light of the light source LS is implemented as a line shaped beam B1 traveling in a direction crossing at right angles to respective pattern extension directions x1, x2, x3, x4 of the multiple patterns. This is because the multiple patterns sequentially arranged to extend in a predetermined direction guide and concentrate the light into an optical path that can be traversed in the least time according to the Fermat's principle that a ray of light traveling in a medium travels along a movement path that can be traversed in the least time.

A distance Lp (which may correspond to a pitch or an average distance) between two adjacent patterns may be about 10 to 500 μm. This distance Lp is based on a minimum distance and a maximum distance for forming a line shaped beam or a three-dimensional effect beam, and when the distance is beyond the range, it may be difficult to implement a line-shaped beam with a three-dimensional effect.

Also, according to implementation of the line shaped beam through a design of the multiple patterns, the multiple patterns guides the second incident beam in a direction expect for the first path by refraction and reflection from the inclined surfaces. Here, among beams from the light source LS toward the inclined surfaces, the second incident beam may be a beam (hereinafter referred to as 'an ambient beam') that meets with the inclined surfaces having an incidence angle corresponding to a direction (for example, a direction toward a first quadrant and a fourth quadrant of both sides of the line-shape beam in the first path that travels to an +y axis on an x-y plan based on the light source) roughly between a +y direction and a +x direction, and a +y direction and a −x direction on a plan defined by the pattern extension directions and the first path, and is refracted or is regularly reflected by the inclined surfaces. In this case, since the second incident beam is dispersed in a relatively wide range by the inclined surfaces, as viewed from an arbitrary point (a standard point, an observing point and the like) on a straight line crossing the x-y plan (corresponding to the first surface or the second surface of the base substrate), the second incident beam becomes ambient beams B2, B3 in which brightness of the periphery of a bright part is relatively low compared to that of a line shaped beam part (hereinafter referred to as "the bright part) resulting from the first incident beam.

In the present embodiment, the pattern extension directions x1, x2, x3, x4 may be directions in which a specific straight line on each inclined surface extends, or a directions in which a specific tangent line in contact with a curved line on each inclined surface extends.

When the pattern extension directions are used, by designing the respective pattern extension directions of the multiple patterns to be parallel to each other, the light passing along the multiple patterns is expressed as a line shaped beam with a three-dimensional effect in a straight line form in which an optical path (the first path) of the light starts from the pattern which first meets with the light of the light source LS and travels to the pattern positioned at the last of sequential arrangement.

Meanwhile, when the respective pattern extension directions of the multiple patterns are designed to cross each other from at least one point or to extend in a radial direction so as not to be parallel to each other (see FIG. 9), the optical path (the first path) of the light passing along the multiple patterns may be expressed in a curved line form in which the optical path starts from the pattern of a point first meeting with light of the light source beam and is bent to a side in which a distance between the adjacent patterns reduces gradually.

Figure 5:
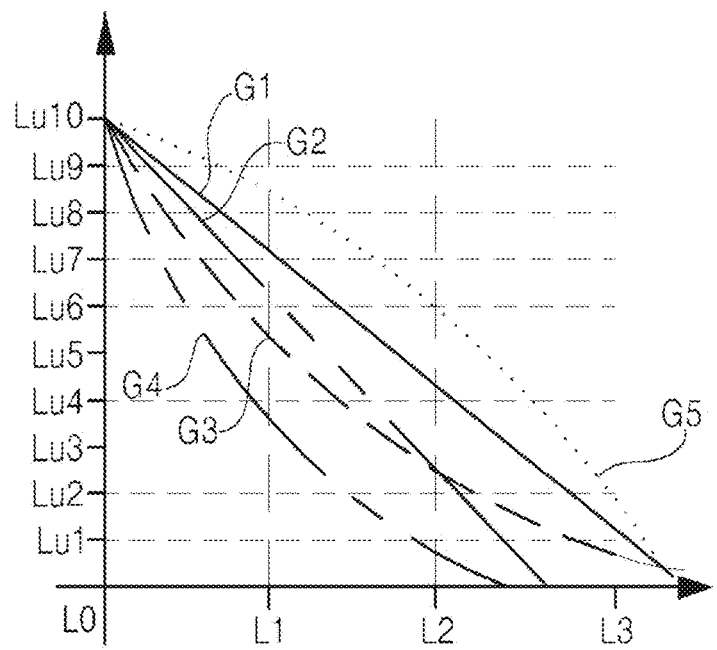
FIG. 5 is a view showing brightness for each area regarding the line shaped beam of the optical member of FIG. 1.

FIG. 5 is a view showing brightness for each area resulting from the line shaped beam of the optical member of FIG. 1;

Referring to FIG. 5, with regard to the three-dimensional effect forming portion of the optical member according to the present embodiment, the multiple patterns sequentially arranged from the light sources are divided into the patterns of three sections, and reviewing brightness resulting from reflection and refraction of the patterns in the respective areas, each of the multiple patterns shows brightness in different ranges according to each distance from the light source.

In other words, when the multiple are divided into first patterns of a first area A1, second patterns of a second area A2 and third patterns of a third area A3 (see FIG. 2), a second brightness of the second patterns is lower than a first brightness of the first patterns and is higher than a third brightness of the third patterns. Here, a second distance L2 between the light source and the specific second pattern farthest away from the light source among the second patterns is longer than a first distance L1 between the light source and the specific first pattern farthest away from the light source among the first patterns and is shorter than a third distance L3 between the light source and the specific third pattern farthest away from the light source among the third patterns.

More specifically, when a maximum brightness of the closest main pattern to the light source is level 10 Lu10, the specific first main pattern positioned at the first distance L1 from the light source may have a brightness of about level 8 Lu8, level 7 Lu7, level 6 Lu6, level 5 Lu5 or level 4 Lu4 according to different pattern designs of the first to fifth embodiment. The specific second main pattern positioned at the second distance L2 from the light source may have a brightness of about level 6 Lu6, level 4 Lu4, level 2 Lu2, or level 1 Lu1 according to pattern designs. Furthermore, the specific third main pattern positioned at the third distance L3 from the light source may have a brightness of about level 2 Lu2, level 1 Lu1, or level 0 (no brightness).

That is, with regard to the multiple patterns previously described with reference to FIGS. 1 and 2, the respective patterns serve as indirect light sources emitting light having a predetermined brightness value by refracting and reflection the light of the light sources, and at this time the multiple patterns may be implemented as indirect light sources having different brightness values which are sequentially reduced according to a design of the patterns.

For example, as shown in FIG. 5, as shown in a brightness curve G1 of a first embodiment, according to a predetermined pattern design of the first embodiment, the first patterns, the second patterns and the third patterns serve as indirect light sources having brightness values of about level 7, level 4 and level 1, respectively. According to this configuration, the multiple patterns may implement three-dimensional effect beams in which brightness substantially regularly reduces from the multiple patterns as a distance from the light sources increases gradually. In order to implement the three-dimensional effect beams, the multiple patterns may be designed in a fixed pitch.

Also, according to a pattern design of a second embodiment, as shown in a brightness curve G2 of the second embodiment, the first patterns, the second patterns and the third patterns serve as indirect light sources having respective brightness values of about level 6, level 3, and level 0. According to such a configuration, the multiple patterns may implement three-dimensional effect beams in which brightness substantially rapidly reduces from the multiple patterns as a distance from the light sources increases gradually. In order to implement the three-dimensional effect beams, the multiple patterns may be designed such that as a distance from the light sources increases gradually, a pitch reduces or a pattern density per a unit length increases at a fixed rate.

Also, according to a pattern design of a third embodiment, as shown in a brightness curve G3 of the third embodiment, the first patterns, the second patterns and the third patterns serve as indirect light sources having respective brightness values of about level 5, level 2, and level 1. According to such a configuration, the multiple patterns may implement three-dimensional effect beams in which a brightness reduction rate between the first area A1 and the second area is larger than a brightness reduction rate between the second area A2 and the third area A3 as a distance from the light sources increases gradually. In order to implement the three-dimensional effect beams, the multiple patterns may be designed in a fixed pitch which is narrower than the pitch of the first embodiment, or may be provided such that a pitch increases gradually according to an increase in a distance from the light sources while being designed in a fixed pitch which is narrower than the pitch of the first embodiment.

Also, according to a pattern design of a fourth embodiment, as shown in a brightness curve G4 of the fourth embodiment, the first patterns, the second patterns and the third patterns serve as indirect light sources having respective brightness values of about level 4, level 1, and level 0. According to such a configuration, the multiple patterns may implement three-dimensional effect beams in which brightness is further rapidly reduced relatively compared to the case of the third embodiment. In order to implement the three-dimensional effect beams, the multiple patterns may be designed in a fixed pitch narrower than the pitch of the third embodiment, or may be provided such that a pitch reduces gradually according to an increase in a distance from the light sources while being designed in a fixed pitch narrower than the pitch of the third embodiment.

Also, according to a pattern design of a fifth embodiment, as shown in a brightness curve G5 of the fifth embodiment, the first patterns, the second patterns and the third patterns serve as indirect light sources having respective brightness values of about level 8, level 6, and level 2. According to such a configuration, the multiple patterns may implement three-dimensional effect beams in which a brightness reduction rate between the first area A1 and the second area A2 is smaller than a brightness reduction rate between the second area A2 and the third area A3 as a distance from the light sources increases gradually. In order to implement the three-dimensional effect beams, the multiple patterns may be designed in a fixed pitch which is wider than the pitch of the first embodiment, or may be provided such that a pitch is gradually reduced according to an increase in the distance from the light sources while being designed in a fixed pitch which is wider than the pitch of the first embodiment.

In the aforesaid first to five embodiments, it is assumed that the respective embodiments are identical to each other with respect to the pattern structures and reflection abilities of the inclined surfaces of the respective patterns for the respective embodiments. When there is a difference in the pattern structures and the reflection abilities among the patterns, by adjusting a pattern design in consideration of this fact, three-dimensional effect beams having brightness which is naturally reduced may be obtained by the indirect light source effects of the multiple patterns sequentially arranged.

According to the present embodiment, thanks to the effect of the reduction in brightness and the effect of the indirect light sources of the multiple patterns resulting from a difference in the distance from the light sources, namely, a difference in optical paths, three-dimensional effect beams or line shaped beams with a three-dimensional effect can be implemented.

Figure 6:
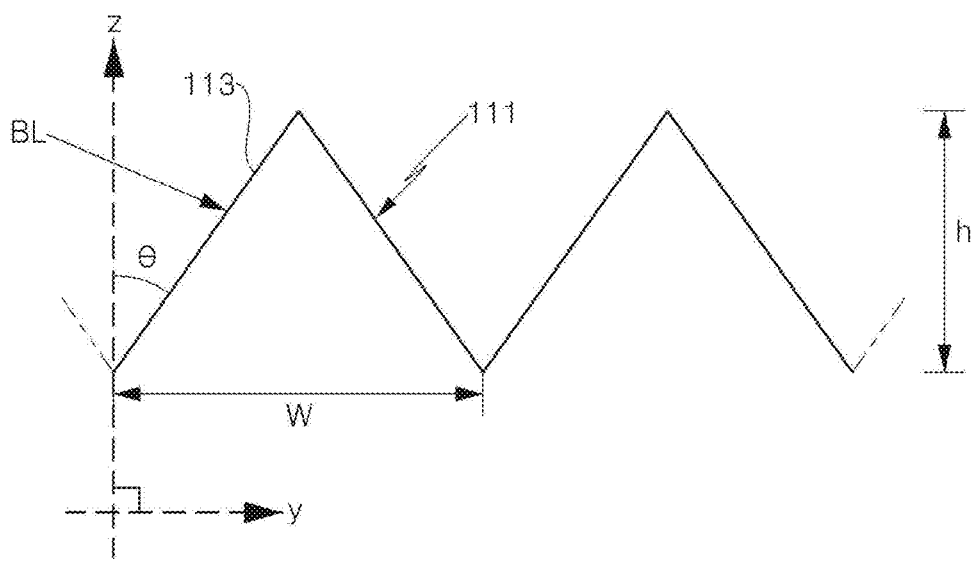
FIG. 6 is a view for explaining a pattern structure of the optical member of FIG. 1.

FIG. 6 is a view for explaining a pattern structure of the optical member of FIG. 1.

Referring to FIG. 6, with regard to the three-dimensional effect forming portion of the optical member according to the present embodiment, the respective patterns 111 is configured to include a triangular cross section form. When each of the patterns 111 has the triangular cross section structure, each of the inclined surfaces 113 has a fixed inclination angle in the y-direction of the pattern arrangement surface. In other words, each of the inclined surfaces 113 is provided to be bent to the extent of a fixed inclination angle θ with respect to the direction (z-direction) crossing at right angles to the pattern arrangement surface.

The inclination angle θ is about 5° or more and about 85° or less. The inclination angle θ is intended to refract and reflect an incident beam BL entering from about the y-direction into roughly the z-direction or the first surface direction or the second surface direction. When the inclination angle θ is smaller than about 5° and larger than about 85°, since refraction and reflection effects of the patterns 111 including the inclined surfaces 113 are insignificant, it may be difficult to implement line shaped beams or line shaped beams with a three-dimensional effect.

Also, the inclination angle θ may be basically appropriately designed in the range of about 5° to 85° according to a refractive index of a medium, namely, the base substrate. For example, when the refractive index of the base substrate is about 1.30 to 1.80, an inclination angle of the inclined surface 113 of each pattern 111 may be larger than 33.7° and smaller than 50.3°, or may be larger than 49.7° and smaller than 56.3°.

Also, the base substrate or the multiple main patterns may be made of a material having a high refractive index. For example, a high refractive index polymer (n=1.80~2.50) and the like used in manufacturing high intensity LEDs may be utilized. In this case, the inclination angle θ may be larger than 23.6° and smaller than about 56.3° according to each refractive index of the multiple patterns.

The inclination angle according to the refractive index is based on the Snell's law, and with reference to FIG. 3, the Snell's law is represented by following Equation 1.

$$\frac{\sin\theta_1}{\sin\theta_2} = \frac{n2}{n1} \quad \text{Equation 1}$$

In Equation 1, sin θ1 is a traveling angle or an incidence angle of light shown in a first refractive index n1, and sin θ2 is an incidence angle or a traveling angle of light shown in a second refractive index n2.

According to the present embodiment, in addition to the inclination angle of the inclined surface descried above, a rate of a width w to a height h of a pitch or a bottom surface may be designed to be limited to a fixed rate. For example, when the patterns are designed so as to emphasize a cubic effect of the three-dimensional effect beams, the width w may be provided to be equal to or smaller than the height h. Also, when the patterns are designed so that the three-dimensional effect beams can express relatively long images, the width w may be provided to be larger than the height h. Also, when each of the multiple patterns 111 has a lenticular form, a rate (h/w) of a width to a height of each of the multiple patterns 111 may be about ½ or less or the inclination angle may be about 45° or more. As such, in the present embodiment, by using the width w and the height h of each pattern 111 as factors for property adjustment, optical images of the line shaped beams with a three-dimensional effect intended to be expressed by the optical member may be efficiently controlled.

In the present embodiment, the width w or a distance (which may correspond to a pitch) between two adjacent patterns may be 10 to 500 µm. This distance may refer to an average distance among the multiple main patterns of the first path, and may be regularly or non-regularly changed according to each pattern design or each desired shape of optical images.

Meanwhile, according to the optical member of the embodiment, the multiple patterns may be configured to convexly protrude from the first surface or the pattern arrangement surface of the base substrate to the outside of the base substrate, but is not limited thereto. The multiple patterns may be configured to be concavely inserted into the inside from the pattern arrangement surface of the base substrate.

Figure 7:
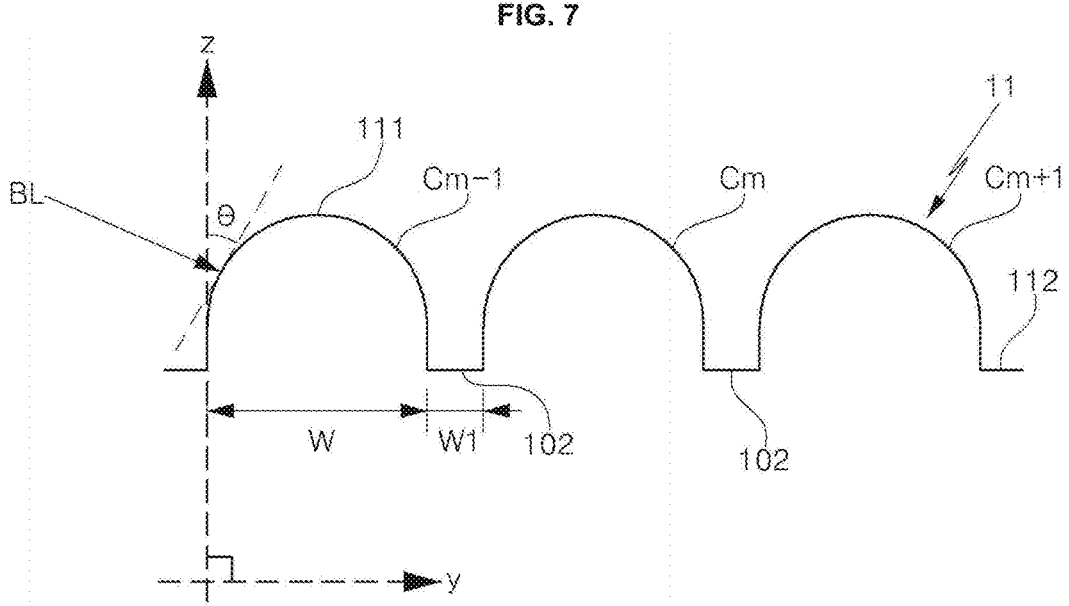
FIG. 7 is a view for explaining another example for the pattern structure of the optical member of FIG. 1.

FIG. 7 is a view for explaining another example for the pattern structure of the optical member of FIG. 1.

Referring to FIG. 7, with regard to the three-dimensional effect forming portion 11 of the optical member according to the present embodiment, each of the multiple patterns 111 may be provided so as to have a pattern structure having a semi-circular cross section or a semielliptical cross section. Also, a separation portion 102 may be provided between two adjacent patterns.

When the multiple patterns include a first pattern Cm−1, a second pattern Cm and a third pattern Cm+1 (wherein, m is a natural number of 2 or more), the separation portion 102 may be provided between the first pattern Cm−1 and the second pattern Cm, and between the second pattern Cm and the third pattern Cm+1. The separation portion, which is a gap between two adjacent patterns, may be provided for convenience of a manufacturing process. The separation portion 102 may be omitted according to a pattern design for specific implementation.

In the present embodiment, the inclined surface of each of the patterns 111 becomes a surface in contact with an arbitrary point in a circular arc form of a pattern surface. A tangent line in contact with the arbitrary point on each of the patterns 111 may be placed at a fixed inclination angle θ in the direction (the z-direction) crossing at right angles to the pattern arrangement surface 112. The inclination angle θ may be larger than 0° and smaller than 90° according to each position of a circular cross section which the beam BL hits.

Figure 8:
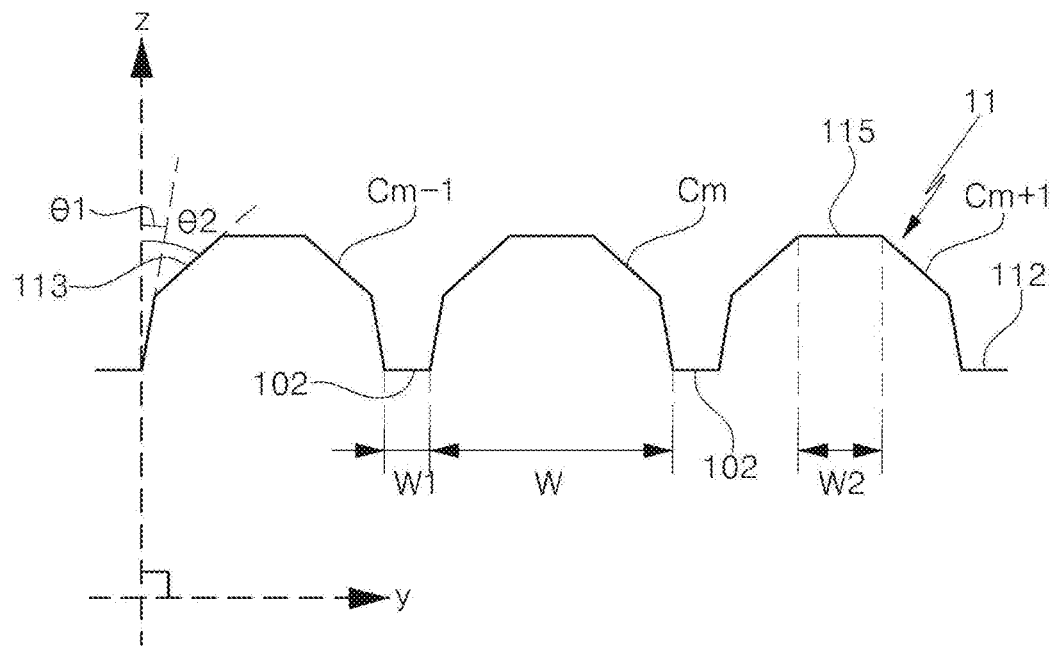
FIG. 8 is a view for explaining a further example for the pattern structure of the optical member of FIG. 1.

FIG. 8 is a view for explaining a further example for the pattern structure of the optical member of FIG. 1.

Referring to FIG. 8, with regard to the three-dimensional effect forming portion 11 of the optical member of the present embodiment, each of the multiple patterns 111 may be provided to have a polygonal shape. The inclined surface 113 of each of the multiple 111 may have a broken-line graph form.

Also, the separation portion 102 may be provided between two adjacent patterns. When the multiple patterns include the first pattern Cm−1, the second pattern Cm and the third pattern Cm+, the separation portion 102 may be provided between the first pattern Cm−1 and the second pattern Cm, and between the second pattern Cm and the third pattern Cm+1, respectively.

In the present embodiment, each of the inclined surfaces 113 of the patterns 111 is provided so as to have multiple inclination angles θ1, θ2 according to the number of segments of the broken-line graph in the direction (z-direction) crossing at right angles to the pattern arrangement surface 112. The second inclination angle θ2 may be larger than the first inclination angle θ1. The first and second inclination angles θ1, θ2 may be designed within the range which is larger than about 5° and smaller than about 85° according to a position where the beam BL hits.

A width w1 of the separation portion 102 is smaller than a width w of each of the multiple patterns in order to implement a natural line shaped beam or a three-dimensional effect beam through the three-dimensional effect forming portion 11. The width w1 of the separation portion 102 may be 1/10 or less of the width of each of the multiple patterns. In order to implement line shaped beams having desired shapes upon designing patterns, the width w1 of the separation portion 102 may be provided to be narrow maximally or the separation portion 102 may be omitted. When the separation portion 102 is provided, the width of the separation portion 102 is designed in several µm or less.

Also, the three-dimensional effect forming portion 11 may have an interrupted surface 115 parallel to the first surface or the pattern arrangement surface 112 in the respective patterns 111. The interrupted surface 115 is a part which does not function to enable light to be substantially emitted to the outside. Thus, since the line shaped beams implemented by the multiple patterns may have an interrupted part corresponding to the interrupted surface 115, a width w2 of the interrupted surface 223 may be appropriately limited in a range of several µm or less in order to implement line shaped beams having desired shapes.

Figure 9:
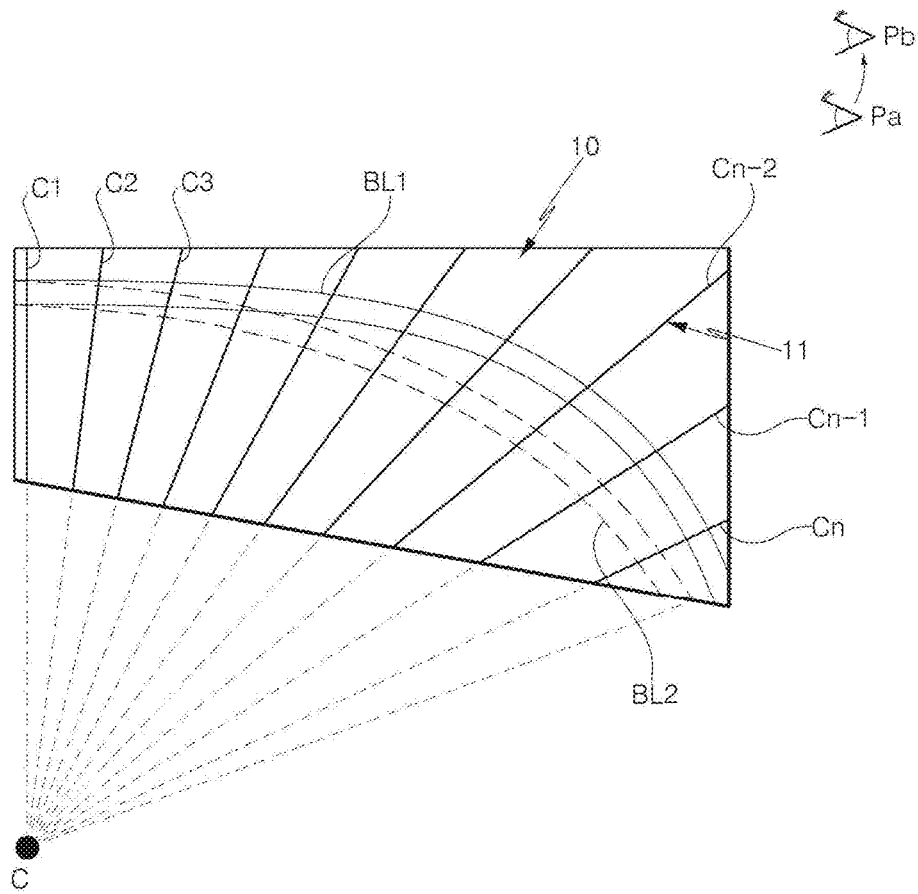
FIG. 9 is a plan view of an optical member according to another embodiment of the present disclosure.

FIG. 9 is a plan view of an optical member according to another embodiment of the present disclosure.

Referring to FIG. 9, the three-dimensional effect forming portion 11 according to the present embodiment includes the multiple patterns provided in a structure in which pattern arrangement directions cross each other from the pattern arrangement surface of the base substrate 10. The multiple patterns include a first pattern C1, a second pattern C2, a third main C3, an n-second pattern Cn−2, an n-first pattern, and an nth pattern Cn in order of the location nearest to the light source. Here, n is a natural number of 6 or more.

The multiple patterns are arranged to extend in directions which are not parallel to each other. That is, with regard to the respective pattern extension directions of the multiple patterns, virtual extension lines thereof may meet at one point of intersection C.

According to the present embodiment, when the light of the light source passes along the three-dimensional effect forming portion 11, the multiple patterns may implement a first line shaped beam BL1 traveling along of the first path (optical path) which is bent with a curvature to a side in which the pattern extension directions cross each other, namely, a side in the which an intersecting point C is present.

Meanwhile, according to the optical member of the present embodiment, when an observing point or a fixed standard point of an observer (a person, a camera or the like) who observes the first line shaped beam BL1 of the first path is moved from a first point Pa to a second point Pb, the multiple patterns are operated so that a second line shaped beam BL2 of another path instead of the first line shaped beam BL1 can be observed. This is because the position of the first path crossing at right angles to the pattern extension directions of the multiple patterns is moved to a direction opposite to the movement direction of the standard point according to the movement of the standard point or the observing point. As such, according to the position of the standard point or the observing point, the multiple patterns may implement the line shape beams having various optical images (a straight line form, a curved line form or a combination form thereof) traveling along the pattern extension directions of the multiple patterns.

Figure 10:
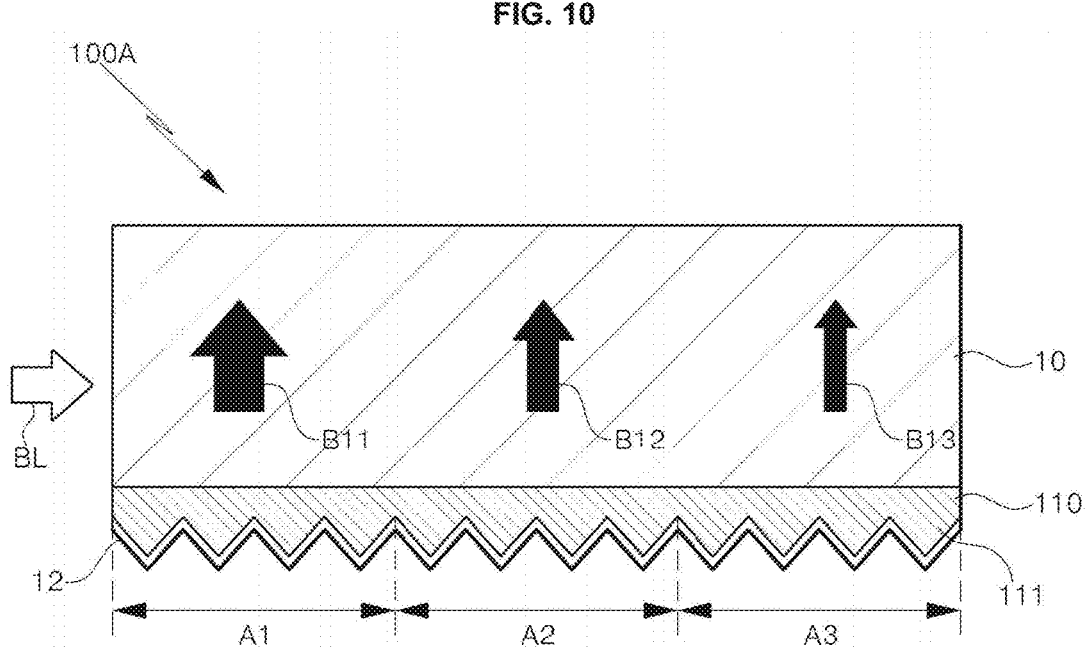
FIG. 10 is a cross-sectional view of the optical member according to another embodiment of the present disclosure.

FIG. 10 is a cross-sectional view of the optical member according to a further embodiment of the present disclosure.

Referring to FIG. 10, an optical member 100A according to the present embodiment is configured to include the base substrate 10, the three-dimensional effect forming portion 11 and the reflective portion 12. The three-dimensional effect forming portion 12 is provided by a separate pattern layer 110 on the second surface of the base substrate 10. The multiple patterns 111 of the three-dimensional effect forming portion 12 are provided on the second surface of the base substrate 10, and the reflective portion 12 is provided on the multiple patterns 111.

The optical member 100A of the present embodiment may be substantially identical to the lighting device 100 explained with reference to FIGS. 1 to 6 except for the fact that the multiple patterns 111 are provided by bonding a separate pattern layer 20 of the second surface of the base substrate rather than being provided by removing a part of the second surface of the base substrate 10, and the reflective portion 12 is provided on the multiple patterns 111.

When the multiple patterns 111 is provided using the separate pattern layer 110, the base substrate 10 and the pattern layer 110 may have the same refractive index. Also, according to some embodiments, the base substrate 10 and the pattern layer 110 may have a predetermined difference in the refractive index. As one example, the refractive index of the base substrate 10 may be smaller than the refractive index of the pattern layer 110 in a range of about 0.2 or less.

This difference in the refractive index is intended to prevent a design for the inclination angle of the inclined surface of the respective patterns from being complicated due to the difference in refractive index upon designing the multiple patterns and a degree of freedom in design from being limited.

According to the optical member 100A of the present embodiment, the line shaped beam implemented by the multiple patterns 111 may be optical images expressed such that beams B11, B12, B13 having different brightness values gradually reduced in the areas A1, A2, A3 sequentially arranged from the light sources according to an increase in a distance from the light sources irradiating the light BL to the optical member 100A, namely, an increase in optical path are irradiated to the first surface direction.

Figure 11:
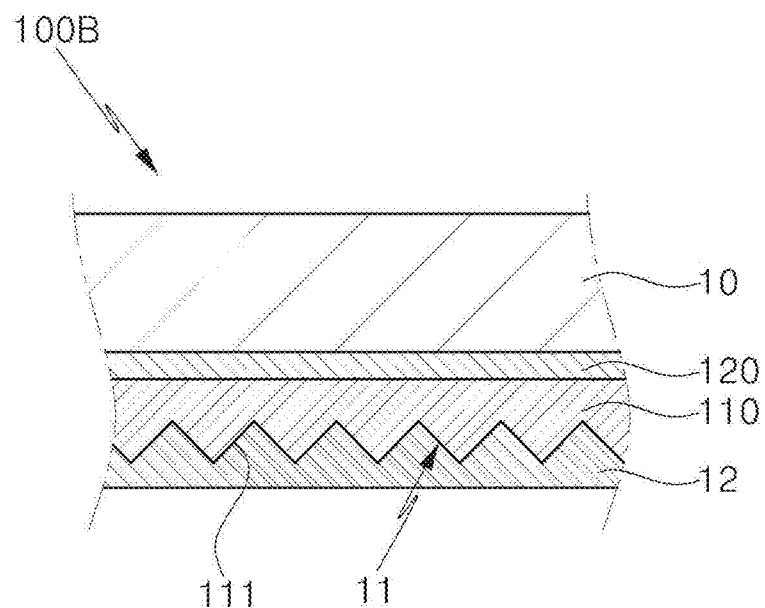
FIG. 11 is a cross-sectional view of a modification example for the optical member of FIG. 10.

FIG. 11 is a cross-sectional view of a modification example for the optical member of FIG. 10.

Referring to FIG. 11, an optical member 100B according to the present embodiment is configured to include: the base substrate 10; an adhesive layer 120; the multiple patterns of the three-dimensional effect forming portion 11 and the reflective portion 12. The multiple patterns 111 are provided by the separate pattern layer 110 bonded to the second surface of the base substrate 10. The adhesive layer 120 is provided between the base substrate 10 and the pattern layer 110. Furthermore, the reflective portion 12 is provided on one surface of the pattern layer 110 and is provided to bury the multiple patterns 111 exposed to the second surface of the base substrate 10.

The optical member 100B of the present embodiment may be substantially identical to the optical member 100A previously described with reference to FIG. 10, except for the adhesive layer 120 between the base substrate 10 and the pattern layer 110, and the reflective portion 12 intended for burying the multiple patterns 111.

The adhesive layer 120 may be provided using an epoxy adhesive film or an epoxy adhesive. Also, in order to adjust a difference in refractive index between the base substrate 10 and the pattern layer 110, the adhesive layer 120 may be made of PEA (Phenoxyethyl Acrylate) which is a high refractive material for adjustment of a refractive index, or may be made a fluorinate polymer, a fluorinate monomer and the like.

A refractive index of the adhesive layer 120 may be larger than a refractive index of the base substrate 10 and a refractive index of the pattern layer 110. In this case, when a difference in the refractive index between the base substrate 10 and the pattern layer 110 is smaller, the light passing along the adhesive layer 120 from the base substrate 10 is refracted at a predetermined angle and is refracted in an opposite direction to the predetermined angle while traveling to the pattern layer 110 again, thereby traveling in a similar direction to the original traveling direction. Of course, when a thickness of the adhesive layer is very thin, the refraction angle may be ignored.

Also, the adhesive layer 120 may be provided to have a predetermined pattern according to some embodiments. In this case, along with the reflective portion 12, the adhesive layer 120 may contribute to the implementation of optical images having various shapes by changing or limiting the light refracted and reflected by the multiple patterns 111 from the second surface of the base substrate 10.

Since the reflective portion 12 is provided to be filled in an uneven part by the multiple patterns 111, the optical member 100 B may have both surfaces in a flat form. This reflective portion 12 may function to prevent the multiple patterns 111 from being damaged by an external impact. The optical member 100B having both surfaces in a flat form can be easily maintained, transported and handled compared to the optical member of FIG. 10.

Figure 12:
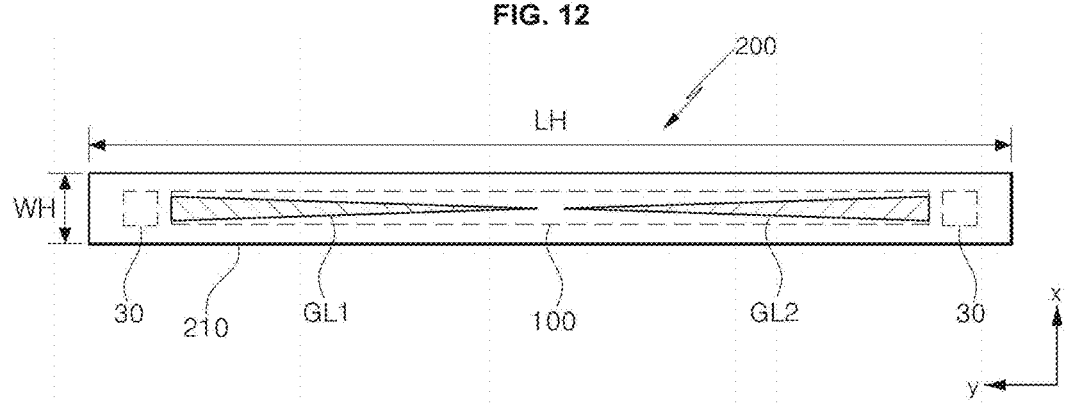
FIG. 12 is a plan view of a lighting device according to an embodiment of the present disclosure.

FIG. 12 is a plan view of a lighting device according to an embodiment of the present disclosure.

Referring to FIG. 12, a light device 200 of the present embodiment is configured to include: the optical member 100; the light source portion 30; and a support member 210. The optical member 100 may be any one of the optical members described with reference to FIGS. 1 to 11. The optical member 100 has the reflective portion (see reference numeral 12 of FIG. 2).

The lighting device 200 has a predetermined length LH and width WH in a plane. The length LH and the width WH may be formed similar or identical to a length or a diameter of a 20 W fluorescent lamp or a 40 W fluorescent lamp.

The light source portion is disposed at both ends, respectively in a length direction of the support member 210 so as to irradiate the light having a light effective area of a hemispherical area toward a central part of the support member 210 in a rectangular bar form. The light source portion 30 includes a first light source and a second light source, and the first light source and the second light source may be disposed so as to irradiate the light to opposite directions (+y direction and −y direction).

Of course, the lighting device of the present embodiment may be implemented to include the first light source and the second light source for irradiating the light to different directions with an angle of more than 90° and less than 180° between the first light source and the second light source (see 30c and 30d of FIG. 23).

In the present embodiment, the light source portion 30 may be provided with any one among various existing light sources such as an incandescent lamp, a halogen lamp, a discharge lamp and the like or may be provided with a guiding or reflection member for guiding or reflecting natural light generated from the sun. Also, according to some embodiments, the light source portion 30 may be provided with light sources including LED (Light Emitting Diode) elements. In this case, the light source portion 30 may include LED light sources and a printed circuit board in which a drive circuit supplying power to the light sources is installed. For convenience of the description, a case in which each of the light sources of the light source portion 30 is an LED package having one or two or more LED elements will be hereinafter referred to.

The support member 210 may be at least one part of a housing of the lighting device 200, a wall inside or outside a building, or one surface of a specific product or an instrument. If any device or product enables the optical member 100 of a sheet phase to be disposed at a place where light of the light source portion 30 is irradiated to one side, the support member 210 may be implemented by the device and product without being specially limited. In addition, the support member 210 may be implemented using a cap, clothes, shoes, a bag, an accessory, indoor or outdoor interior components and the like.

According to the present embodiment, the light irradiated from two light sources to a central part of the support member 210 may be implemented as two line shaped beams with a three-dimensional effect GL1, GL2 in which the light starts from both ends of the support member 210 by refraction and reflection from the multiple main patterns and disappears at the central part of the support member 210. Also, some embodiments, when the multiple effect forming portion disposed to overlap with the three-dimensional effect forming portion is used, a single line shaped beam with a three-dimensional effect may be converted in and displayed as multiple line shaped beams with a three dimensional effect.

That is, when the optical member 100 is disposed on the support member 210, and the light is irradiated from one side of the optical member to the optical member, the lighting device 200 implements line shaped beams of a specific optical path via the multiple patterns of the optical member and implements line shaped beams GL1, GL2 with a three-dimensional effect having a perceptional depth in a vertical direction (a direction crossing at right angles to an x-y plane) of the pattern arrangement surface through a difference in optical path resulting from a distance from the light sources.

Figure 13:
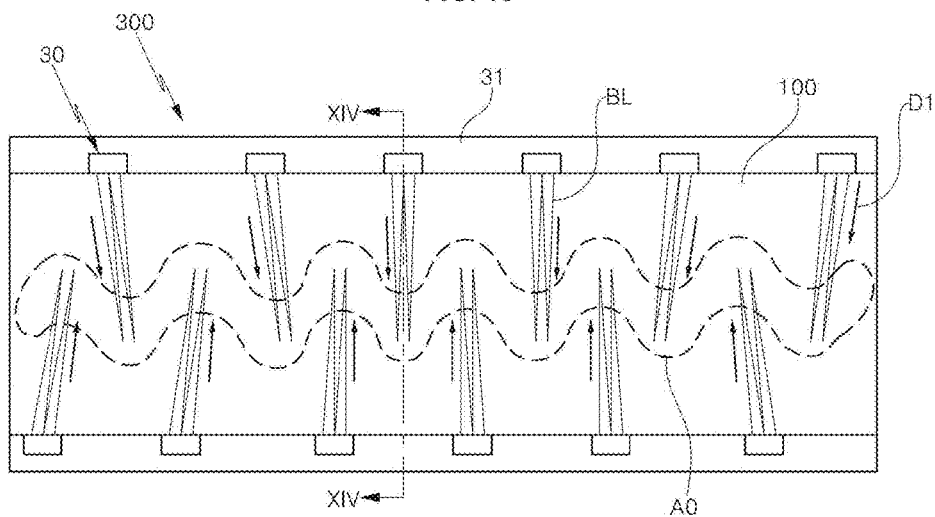
FIG. 13 is a plan view of a lighting device according to another embodiment of the present disclosure.
Figure 14:
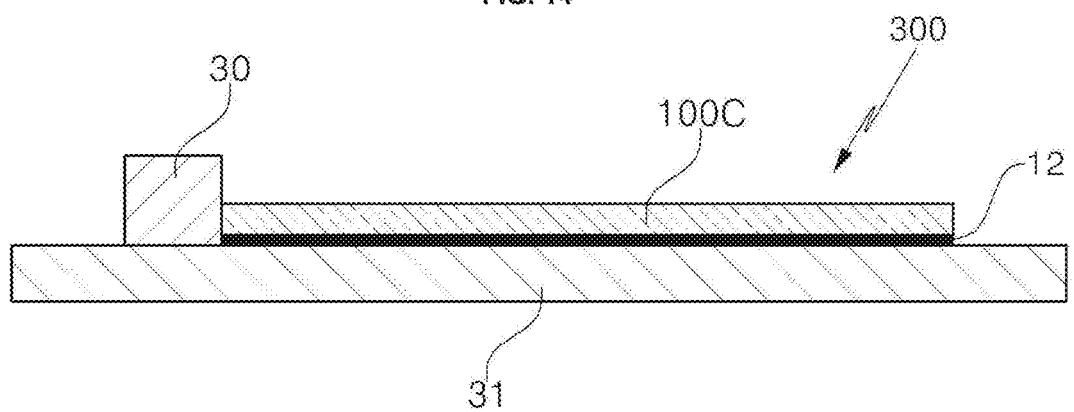
FIG. 14 is a schematic cross-sectional view of the lighting device of FIG. 13 taken along line XIV-XIV.

FIG. 13 is a plan view of a lighting device according to the other embodiment of the present disclosure. FIG. 14 is a schematic cross-sectional view of the lighting device of FIG. 13 taken along line XIV-XIV.

Referring to FIGS. 13 and 14, the lighting device 300 according to the present embodiment is configured to include a lighting plate 31; the reflective portion 12 and an optical member 100C.

The lighting plate 31 may be a separate member in a plate form and may be connected to a device, an instrument, a building and the like or may be provided as a part of a device, an instrument and a building. Also, the lighting plate 31 may integrally include the light source portion 30 on one surface thereof. In this case, the lighting plate 31 may be configured to include an insulating substrate and a printed circuit board on the insulating substrate. The lighting plate 31 may be substantially the optical member of FIG. 12 except for the fact the lighting plate includes the printed circuit board.

In the present embodiment, the light source portion 30 includes twelve light sources arranged in a state of being divided into two groups from the side parts of upper and lower sides so that the light can be irradiated from the light plate 31 to directions roughly facing each other. Each of the light sources includes two LED elements as a single package and irradiates two rays of light. Also, in the light source portion 30, the first light source and the second light source belonging into the first group and the second group irradiate the beams to the same direction or irradiate the beams from the same direction to directions crossing each other.

The reflective portion 12 is provided on one surface of the lighting plate 31 in which the light source portion 30 is disposed. The reflective portion 12 may be substantially identical to the reflective portion described with reference to FIGS. 1 and 2, except for the fact that the reflective portion 12 is not integrally formed with the optical member 100c.

The optical member 100C is configured to include the base substrate and the three-dimensional effect forming portion. The configuration of the optical member 100C may be identical to the configuration of the optical member described with reference to FIGS. 1 to 11 except for the reflective portion 12 as well as the element wherein the reflective portion 12 is not integrally included in the optical member.

However, the three-dimensional effect forming portion of the optical member 100C includes the multiple patterns of twelve groups provided in multiple pattern areas corresponding to the multiple light sources of the light source portion 30, and the multiple patterns of the respective groups have pattern extension directions for limiting an optical path of the light sources to the first path (D1 and the like) and extending in a direction crossing at right angle to the first path.

According to the present embodiment, an optical width of the line shaped beam may be smaller than a width of the light emitting surface of the LED light source irradiating the light to the multiple patterns of the respective areas. Here, the optical width and a width of the light emitting surface may correspond to a maximum width for two beams BL and a width of a side of the light source portion 30 from which the light is emitted. For reference, in a case where the multiple patterns of the present embodiment do not exist, the light source portion may irradiate the light having a light effective area to roughly a hemispherical area based on the light emitting surface of the light source portion, but in the present embodiment, the respective light sources of the light source portion 30 seem to irradiate the line shaped beam smaller than the width of the light emitting surface in the light effective area due to the multiple patterns.

According to the present embodiment, when the optical member 100 is arranged on the lighting plate 31 in which the multiple LED light source are provided, and the light of the LED light sources is irradiated to the optical member 100, illumination may be implemented by various line shaped beams with a three-dimensional effect in which the light starts from both edges of the lighting device 300, in which the respective light sources are disposed, by refraction and reflection operations of the multiple patterns provided in the respective pattern areas of the optical member 100 and disappears at roughly the central area A0. In particular, thanks to the reflection operation of the reflective portion 12, the line shaped beams may be more clearly implemented compared to the case in which the reflective portion exists.

Figure 15:
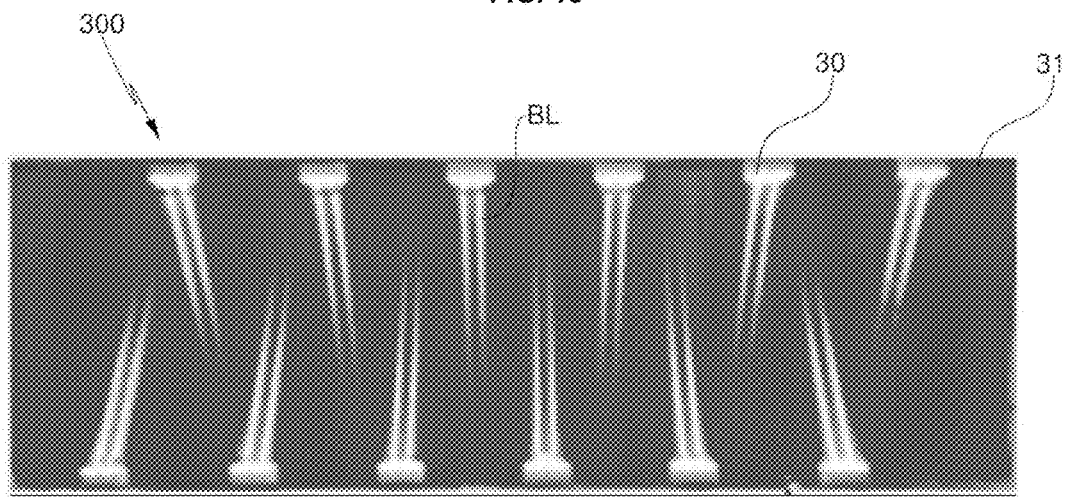
FIG. 15 is a view showing an operational status of the lighting device of FIG. 13.
Figure 16:
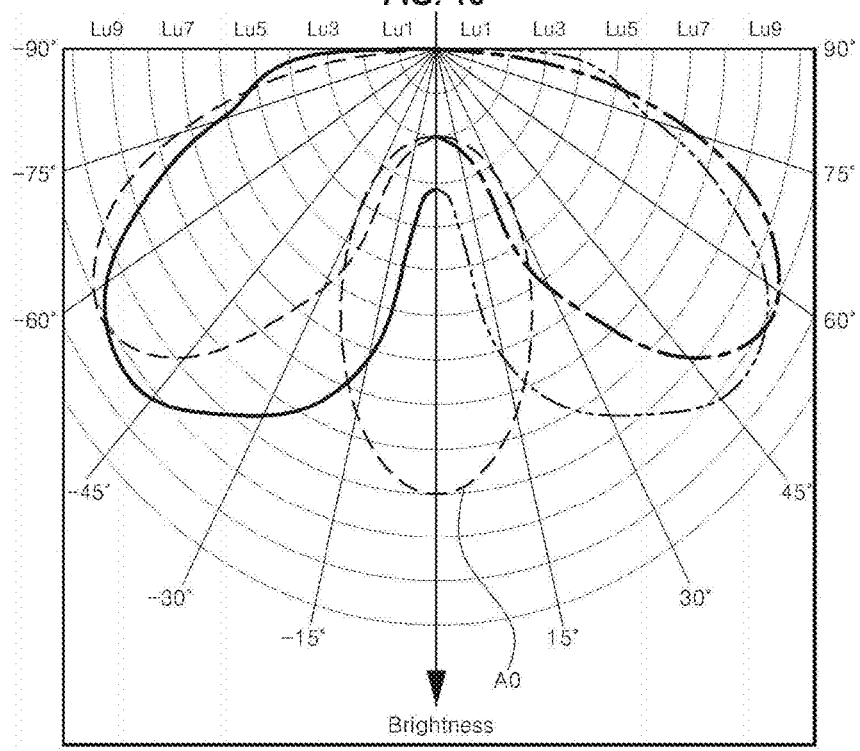
FIG. 16 is a graph showing measured brightness of the lighting device of FIG. 15.

FIG. 15 is a view showing an operational status of the lighting device of FIG. 13. FIG. 16 is a graph showing measured brightness of the lighting device of FIG. 15.

As shown in FIG. 15, a lighting device 300 according to the present embodiment implements twelve line shaped beams via the patterns provided in different areas of the optical member, respectively when the light BL of twelve light sources of the light source portion 30 is irradiated to the multiple patterns of the optical member.

Also, the lighting device 300 may implement three-dimensional effect beams in which the light BL emitted from the light sources travels along an arrangement direction of the multiple patterns and disappears at the central part (see A0 of FIG. 13) of the pattern areas in which the patterns are arranged.

As such, the lighting device 300 may provide illumination using the three-dimensional effect beam implemented in the optical path of a relatively very short distance (for example, about 100 to 200 mm) through a pattern design of the optical member.

Here, the very short distance may correspond to a short distance beyond '1/(hundreds to thousands of' times compared to a distance (for example, several meters to tens of meters) in which light is naturally reduced and disappears when the light of the LED light sources is irradiated from the optical member of a comparative example in which the main patterns of the three-dimensional effect forming portion according to the present embodiment are not provided.

When brightness of the lighting device 300 is measured using a predetermined brightness measuring device disposed in the central part of the lighting device, a brightness graph illustrated in FIG. 16 may be obtained.

Referring to FIG. 16, when the intensity of light of twelve light sources is Lu12 maximally, a first brightness in the central area A0 of the front of the light emitting surface of the light source of the lighting device is about Lu5 which is relatively largely small compared to a second brightness of about Lu7 to about Lu12 in the other areas. Moreover, in consideration of the fact that the first brightness in the central area A0 is affected by the second brightness in the other areas of the periphery, the intensity of light in the central area A0 of the light emitting surface of the lighting device can be really predicted to be near to Lu0 (no brightness).

According to the present embodiment, by using the line shaped beams with a three-dimensional effect of two groups extending roughly in directions facing each other, illumination showing high brightness at an edge part in an illumination area in a rectangular shape and low brightness at a central part may be provided.

FIG. 17 is an operational status view of the lighting device according to the other embodiment of the present disclosure.

Referring to FIG. 17, the lighting device according to the present embodiment is configured to include various LED elements regularly arranged as light sources. Various LED elements include first LED elements of a first arrangement line and second LED elements of a second arrangement line, wherein a light emission direction of the first LED elements and a light emission direction of the second LED elements are set to be opposite to each other. Furthermore, it is assumed that the first and second LED elements irradiate the light roughly to a hemispherical area based on the light emitting surface.

According to the aforesaid lighting device, the light of the respective LED elements is sequentially emitted to the outside while crossing the pattern arrangement surface of the patterns beyond a critical angle by reflection and refraction from the patterns of the three-dimensional forming portion arranged to be sequentially far away from the respective LED elements. Thanks to such a configuration, the lighting device forms various optical images of the line shaped beam with the three-dimensional effect via the three-dimensional forming portion corresponding to the respective LED elements.

The line shaped beam with the three-dimensional effect expresses different optical images of different optical paths according to movement of the observing point of the observer or the predetermined standard point. As one example, optical images of the lighting device are expressed as illustrated in (a) of FIG. 17 as viewed from an upper side in a state of the lighting device being placed in a flat bottom.

That is, the optical images of FIG. 17(*a*) are expressed as optical images in which a first line shaped beam group and a second line shaped beam group of two groups of the LED elements for irradiating the light in opposite directions cross in directions facing each other like folding two hands, and a crossing angle is gradually increased from a central area to areas of both sides of the left and the right. Also, the optical images of FIG. 17(*a*) are expressed so that light emitted from the LED elements positioned at adjacent arrangement lines according to a difference in a viewing angle with respect to the respective LED elements has an angle (for example, about 180°±45°) beyond a predetermine part from opposite directions rather than being irradiated in the opposite directions.

When viewing the lighting device from a front lower side near to a flat bottom where the lighting device is placed, optical images of the lighting device are expressed as illustrated in (b) of FIG. 17. That is, when the optical images of FIG. 17(*b*) are compared to those of FIG. 17(*a*), the line shaped beams of the multiple LED elements in the same arrangement line appear to be separated from each other rather than overlapping to each other in a direction roughly vertical to the pattern arrangement surface, so that the line shaped beams can be expressed as optical images having a higher perceptional depth or a three-dimensional effect as a whole.

Furthermore, when viewing the lighting device from the lower part of a side close to the flat bottom where the lighting device is placed, optical images of the lighting device are expressed as illustrated in (c) of FIG. 17. That is, the optical images of FIG. 17(*c*) are expressed as optical images in which the rays of light in adjacent areas do not cross each other and extend in a zigzag form in multiple lines side by side as the rays of light gradually travel near to far areas.

As such, the lighting device of the present embodiment may implement different optical images of different optical paths according to a change of the observing point of an observer or a predetermined standard point.

Figure 18:
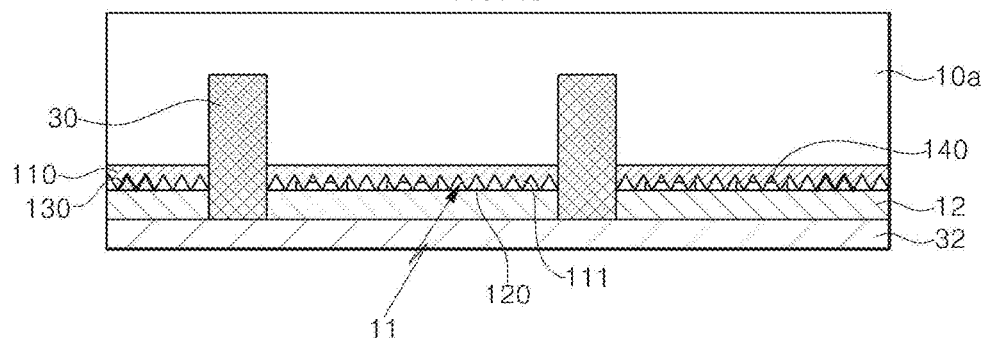
FIG. 18 is a partially enlarged cross-sectional view of a structure which can be applied to the lighting device of FIG. 17.

FIG. 18 is a partially enlarged cross-sectional view of a structure which can be applied to the lighting device of FIG. 17.

Referring to FIG. 18, a lighting device 300A according to the present embodiment is configured to include: the base substrate 10a; the three-dimensional effect forming portion 11; the reflective portion 12; and the light source portion 30.

The base substrate 10a is made of a material for enabling an internal incident beam to be guided. A material of the base substrate 10a may be resin. When a resin layer is used, the base substrate 10a may be a light guide portion having flexibility showing a thin thickness and bending.

The resin layer is basically made of a resin material which enables guiding of light. The resin layer may be made of ultraviolet curable resin including an oligomer. Also, the resin layer may be made of resin including a urethane acrylate oligomer as a main material. For example, the resin layer may be produced by using the urethane acrylate oligomer as a synthetic oligomer and a polyacrylic polymer. Of course, the resin layer may further contain a monomer mixed with IBOA (isobornyl acrylate), HPA (hydroxylpropyl acrylate), 2-HEA (2-hydroxyethyl arrylate) and the like which are low boiling point and diluted type reactive monomers. Also, a photo initiator or an antioxidant may be further mixed as an additive.

The three-dimensional effect forming portion 11 is configured to include the multiple patterns 111. Each of the multiple patterns 11 has an inclined surface, and the inclined surface is a mirror-like finishing surface having a smooth surface roughness beyond a predetermined level. In the present embodiment, the three-dimensional effect forming portion 11 is provided by a separate pattern layer 110 bonded to one surface of the base substrate 11a. The other surface of the pattern layer 20 is bonded to one surface of the base substrate 11a, and one surface of the pattern layer is a pattern arraignment surface on which the multiple patterns 111 are provided.

The reflective portion 12 is provided as a reflective in a film form on the pattern arrangement surface of the pattern layer 111. The reflective portion 12 is formed of a material having high reflection efficiency to reflect the light emitted from the light source portion 30 via the three-dimensional forming portion 11 to the side on the three-dimensional forming portion 21 so that light loss can be reduced and a line shaped beam having an three-dimensional effect can be more clearly expressed.

In order to increase a reflection property of light and a dispersion property of light, a synthetic resin in which a white pigment is diffused and contained may be used as a material of the reflective portion 12. For example, titanium oxide, aluminum oxide, zinc oxide, lead carbonate, barium sulfate, calcium carbonate and the like may be used as the white pigment. Polyethylene terephthalate, polyethylene naphtaenate, acryl resin, poly carbonate, polystyrene, polyolefin, cellulose acetate, weather resistant vinyl chloride and the like may be used as the synthetic resin, but the present disclosure is not limited thereto.

A separation portion 120 may be provided between the reflective portion 12 and the multiple patterns 111. The reflective layer separation portion 120 may be an air gap filled with air, but is not limited thereto. According to some embodiments, the reflective layer separation portion 120 may be filled with a material having a different refractive index from that of the pattern layer 20.

Also, the reflection portion 12 may be adhered to the pattern layer 110 via predetermined adhesive patterns 130 upon lamination on the pattern layer 110. In this case, the reflective portion 12 may contribute diversity of optical images by controlling an amount or a position of light reflected from the reflective portion 12 according to a refractive index, a reflection ability of the adhesive patterns Also, the lighting device 300A according to the present embodiment may further include reflective patterns 140 on the reflective portion 12. The reflective patterns 140 may be provided on one surface of the reflective portion 12 facing the pattern layer 110 using an ink patterns. The same material as that of the reflective portion 12 may be used as a material of the reflective patterns 140. When the reflective patterns 140 are used, the intensity of light reflected from the reflective portion 12 can be adjusted, thereby contributing to implementation of optical images having various shapes.

The light source portion 30 includes light sources. Each of the light sources may be configured to include one or two or more light emitting diode (LED) elements. The LED element may have a side view type or an upper view type light emitting structure. Also, the light source portion 30 may be configured to include a separate printed circuit board 32. The printed circuit board 32 may be a flexible printed circuit board in which conductive circuit patterns are provided on a flexible insulating substrate. In the present embodiment, as viewed from a cross section of the light source portion, the light source of the light source portion 30 may be connected to the printed circuit board 32 in such a form as to pass through the pattern layer 110 and the reflective portion 12, and may be driven so as to irradiate light to the three-dimensional forming portion 11 using power supplied through the printed circuit board 32 and a control signal.

According to the present embodiment, in the lighting device 300A, when the reflective portion 12 on the printed circuit board 32, the pattern layer 110 and the light sources of the light source portion 30 are buried by the base substrate 10a provided using the resin layer, the light of the light source portion 30 is guided by the light guide portion 10. Furthermore, when line shaped beams are expressed by reflection and refraction from the multiple patterns 111 of the three-dimensional effect forming portion 111, the line shaped beams may be more clearly implemented by reflection from the reflective portion 12.

Also, line shaped beams having various shapes or optical images having desired shapes using the line shaped beams may be more efficiently implemented by controlling a light reflection ability or a reflection area of the reflective portion 12 using the reflection patterns 140 on the reflection portion 12 or the adhesive patterns 130.

Figure 19:
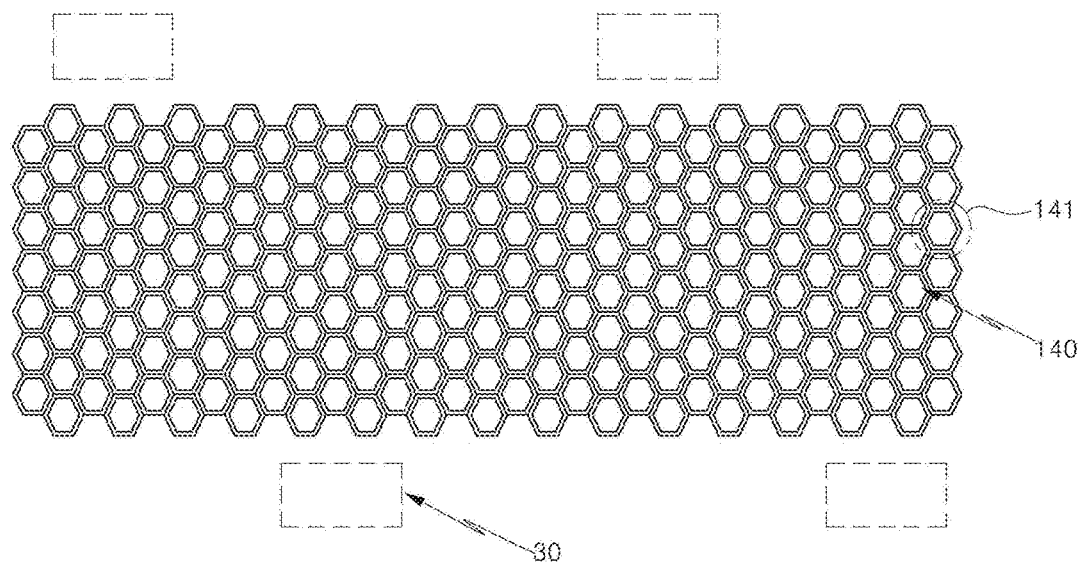
FIG. 19 is a plan view of a reflective pattern which can be applied to the lighting device of FIG. 18.

FIG. 19 is a plan view of reflective patterns which can be applied to the lighting device of FIG. 18.

Referring to FIG. 19, according to the lighting device according to the present embodiment, the reflective patterns 140 may be provided in a form in which unit patterns 141 having a hexagonal ring-like shape are arranged in plural number, but is not limited thereto. For example, in addition to the hexagonal shape, the reflective patterns 140 may be designed in a polygonal shape, a circular shape, an elliptical shape, a star-like shape, a winding ring-like shape, a stripe shape, a mesh shape or a combination thereof. That is, the pattern shape of each of the reflective patterns 140 may be designed according to optical images having a desired shape or desired three-dimensional effects (clearness, haziness, spreading, and the like) with respect to the optical images.

The reflective patterns 140 may be formed by performing printing with an ink including a reflective material on one surface of the reflective portion 12.

When the reflective patterns 140 are used, by reflecting some beams traveling to a lower side of the three-dimensional effect forming portion via the three-dimensional effect forming portion (see reference numeral 11 of FIG. 18) from the light source 30 and returning the reflected beams to the three-dimensional effect forming portion, all beams of the light source portion may be emitted to an upper side of the light guide portion 10 in the first path via the multiple patterns of the three-dimensional effect forming portion. Also, optical images of the line shaped beams with the three-dimensional effect may be variously changed by adjusting a reflection amount or a reflection area of light according to a design of the reflective pattern 140.

Meanwhile, the adhesive pattern 130 provided on one surface of the reflective portion (reference numeral 12 of FIG. 18) along the reflective pattern 140 may be provided in separate patterns which overlap with or do not overlap with the reflective pattern 140 without being limited thereto. According to some embodiments, the adhesive pattern 130 may be provided by containing a predetermined adhesive component into the reflective pattern 140. In this case, the reflective pattern 140 may be the adhesive pattern (see reference numeral 130 of FIG. 18).

Figure 20:
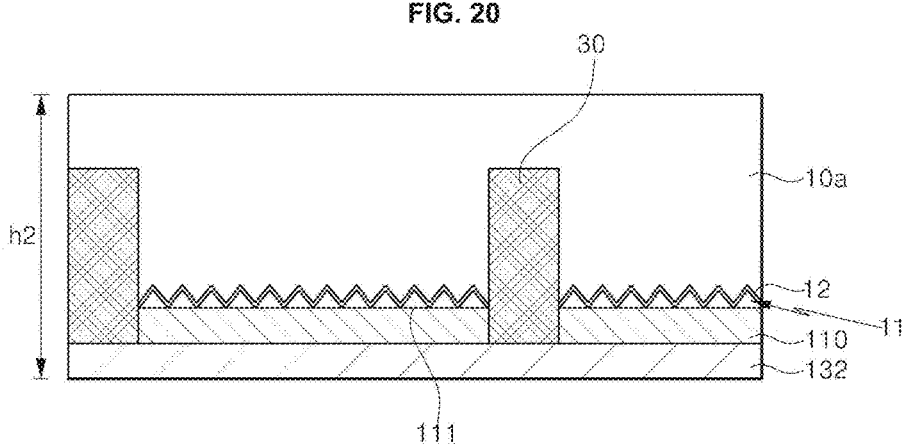
FIG. 20 is a partially enlarged cross-sectional view of a structure which can be applied to the lighting device of FIG. 17.

FIG. 20 is a partially enlarged cross-sectional view of a structure which can be applied to the lighting device of FIG. 17.

Referring to FIG. 20, a lighting device 300B according to the present embodiment is configured to include: the base substrate 10a; the three-dimensional effect forming portion 11; the reflective portion 12; and the light source portion 30. The three-dimensional forming portion 11 is provided on one surface of the separate pattern layer 110 disposed on the printed circuit board 32 of the light source portion 30.

When the multiple patterns 111 of the three-dimensional effect forming portion 11 are disposed between the pattern layer 110 and the base substrate 10a, the multiple patterns 111 may not be property operated as patterns having inclined surfaces due to a resin layer which forms the base substrate 10a. In particular, when the refractive index of the base substrate 10a is similar to that of the pattern layer 110, for example, when a difference in the refractive index therebetween is 0.2 or less, a medium boundary therebetween is unclear, and accordingly, the light is not properly reflected from the respective inclined surfaces of the patterns. This shows that the light of the light source portion 30 may not be guided into an upper side of the base substrate 10a by refraction and reflection from the multiple patterns of the three-dimensional effect forming portion 11, and thus the line shaped beam with a three-dimensional effect may not be implemented.

Accordingly, in the light device 300B of the present embodiment, reflective portion 12 is provided on the multiple patterns 111 provided on one surface of the pattern layer 110 such that, according to the inclination angles of the inclined surfaces of the multiple patterns 22 and the incidence angles of the incident beams, the beams of the light source portion 30 or the incident beams traveling the inside of the base substrate 10a are effectively sequentially reflected via the reflective portion 12 on the multiple patterns 22 to be guide to an upper side of the base substrate 10a.

The reflective portion 12 is a coating layer in which the multiple patterns 22 are thinly coated with a reflective material. Ag, Al, stainless steel (304SS) and the like may be used as a material of the reflective portion 12.

The lighting device 300B of the present embodiment is substantially identical to the lighting device of FIG. 18, except for the fact that the multiple patterns 111 are provided between the pattern layer 110 and the base substrate 10a, and instead of the reflective portion in a film form, the separation portion 120, the adhesive patterns 130 and the reflective patterns 140 of the lighting device of FIG. 18, the reflective portion 12 in a coating layer form is provided on the multiple patterns 111, and accordingly, the detailed description of constitutive elements identical or similar to those of the lighting device of FIG. 18 is omitted in order to avoid overlapping of the description.

The type of patterns for the multiple patterns 111 may have various shapes such as a prism shape, lenticular shape, a tetrahedral shape, a conical shape and the like.

In the present embodiment, a thickness h2 of the lighting device 300B is 100 to 250 μm or less. When the thickness of the lighting device 300B is smaller than 100 μm, it is difficult to implement LED light sources in a structure in which a resin layer is buried, and durability may be reduced. Also, when the thickness of the lighting device 300B is larger than 250 μm, the thickness becomes thick, and accordingly, it may be difficult to wind it on a roll.

Figure 21:
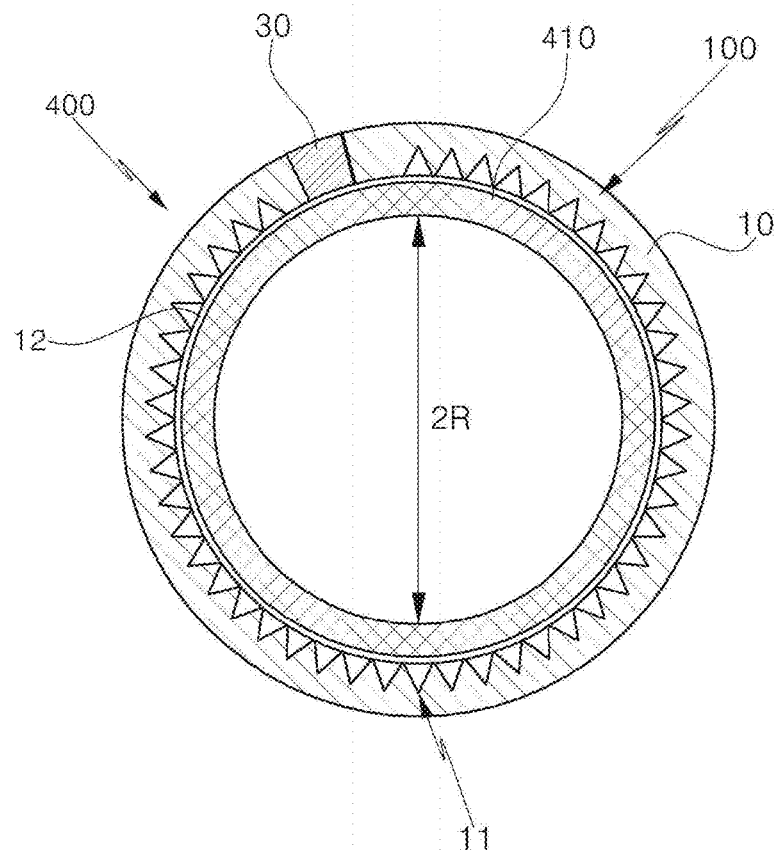
FIG. 21 is a cross-sectional view of a lighting device according to a further embodiment of the present disclosure.

FIG. 21 is a cross-sectional view of a lighting device according to a further embodiment of the present disclosure.

Referring to FIG. 21, a lighting device according to the present embodiment is configured to include: the base substrate 10; the three-dimensional effect forming portion 11; the light source portion 30; and a support member 410. The optical member 100 includes the base substrate 10 and the three-dimensional effect forming portion 11. The three-dimensional effect forming portion 11 includes the multiple patterns sequentially arranged on the pattern arrangement surface of the base substrate 10

The optical member 100 is provided in a film form. A thickness of the optical member 100 is about 25 to 250 μm or less. When the thickness of the optical member 100 is smaller than 25 μm, it may be difficult to produce the optical member and durability may be largely reduced. Also, when the thickness of the optical member 100 is larger than 250 μm, flexibility is reduced, so that it may be difficult to install the optical member at the support member 410 having a predetermined curvature.

The optical member 100 may be substantially identical to any one of the optical members previously descried with reference to FIGS. 1 to 11, except for the fact that the optical member has a film form and flexibility. That is, in the present embodiment, as specific factors such as a structure of the patterns provided on the pattern arrangement surface of the base substrate 10, and a pitch thereof and a pattern density are appropriately designed, the optical member 100 may implement line shaped beams with a three-dimensional effect having a perceptional depth according to a difference in the distance from the light sources in the first path by specifying an optical path of light irradiated from the light source portion 30 to the three-dimensional effect forming portion to the first path and limiting a width of the first path.

The light source portion 30 is supported by the support member 410 and is disposed so as to irradiate light to one side of the optical member 100. The light source portion 30 may be provided as an LED package or an LED string including one or two or more LED elements. When the light source portion includes multiple LED elements, several kinds of light irradiated from the light source portion 30 may be displayed as multiple line shaped beams through the optical member 100.

The support member 410 may be a housing having a curvature, a wall inside or outside a building having a bent portion, or one surface of a product. In the present embodiment, the support member 410 has a hollow type cylindrical shape having a predetermined diameter 2R.

If any device or product enables the optical member 100 of a sheet phase to be disposed at a place where light of the light source portion 30 is irradiated to one side, the support member 410 may be implemented by the device and product without being specially limited. Furthermore, the support member 410 may be implemented using a cap, clothing, shoes, a bag, an accessory, indoor and outdoor interior components and the like to which the optical member 100 of the sheet phase can be attached.

According to the present embodiment, as the optical member is bonded to an application product, a product or a building having a bent portion or a curvature, illumination having various deigns may be implemented by line shaped beam or line shaped beams with a three-dimensional effect.

Figure 22:
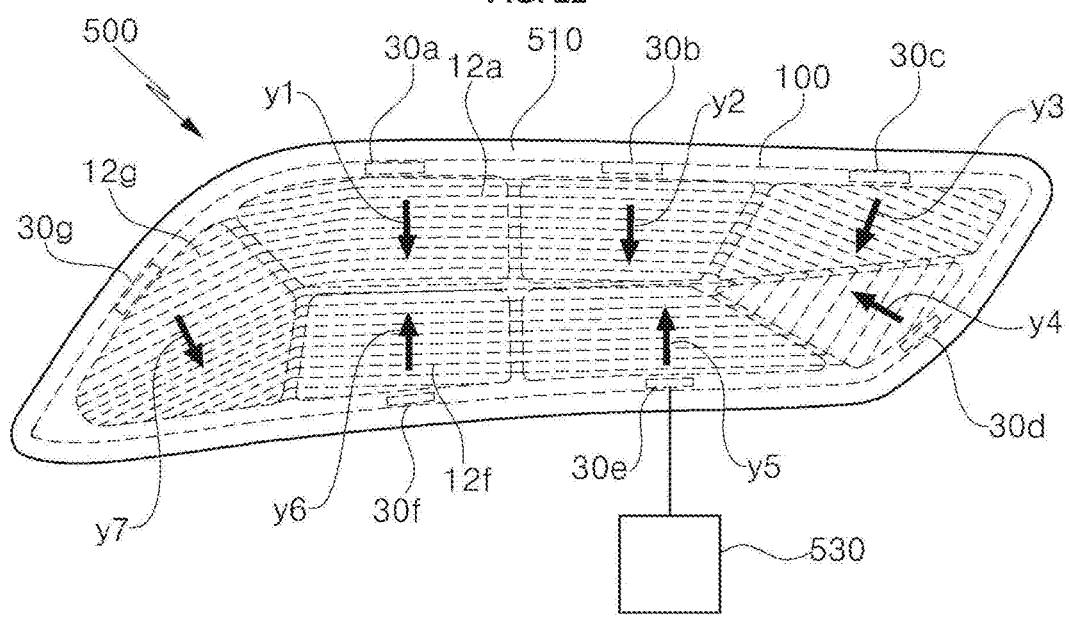
FIG. 22 is a plan view of a lighting device according to yet another embodiment of the present disclosure.

FIG. 22 is a plan view of a lighting device according to yet another embodiment of the present disclosure.

Referring to FIG. 22, a lighting device 500 according to the present embodiment is configured to include: the optical member 100; multiple light source portions 30*a* to 30*g*; an outer lens, 510.

The optical member 100 includes multiple patterns arranged in individual directions in multiple areas 12*a*, 12*f*, 12*g* and the like of the base substrate. The optical member 100 is substantially identical to any one of the optical members previously descried with reference to FIGS. 1 to 11, except for the fact that the optical member has flexibility so as to be disposed on one surface (an inner side and the like) of the outer lens 510 having a curvature, and accordingly, the detailed description thereof is omitted in order to avoid overlapping of the description.

The multiple light source portions 30*a* to 30*g* are disposed at an edge part of the outer lens 510 so as to irradiate light from one side of the patterns provided in the multiple areas of the optical member 10. Each of the light source portions includes light sources each including one or two or more LED elements. Also, when the lighting device 500 is used as illumination for a car, the light sources of the respective light source portions may be operated by power supplied from a car battery 530.

The outer lens 510 includes to a cover or a lens disposed on an outer surface of the lighting device such as a light device for a vehicle (a headlight, a rear light and the like), an outdoor lighting device and the like. When the lighting device is used as a car lamp, the outer lens 510 may be provided on one surface, in which the optical member 100 is disposed, so as to have a curvature leading to a curved surface of a vehicle body. The outer lens 510 may be made of a transparent plastic material, for example, engineering plastic and the like.

According to the present embodiment, the light irradiated from the respective light source portions is irradiated to directions (y1 to y7) toward the central part from the edge of the outer lens 510, and is expressed as a line shaped beam or a line shaped beam with a three-dimensional effect via the patterns provided in the multiple areas of the optical member 100, respectively.

Also, as described based on the aforesaid specific embodiment (see FIG. 9), the present embodiment may provide the lighting device capable of implementing multiple line shaped beams with three-dimensional effects expressed by traveling along the pattern extension directions of the patterns in the respective areas according to the movement of a standard point or an observing point. That is, the lighting device 500 may be used as a car lamp such as a headlight for a car, a rear light, indoor illumination, a fog lamp, a door scarf or the like. Also, in terms of a volume, a thickness, a weight, a price, a life span, stability, a degree of freedom in design, and easiness of installation, the lighting device 500 may be usefully applied as the car lamp compared to the existing car lamps.

Meanwhile, even though the present embodiment is mainly based on the case in which the lighting device 500 of the present embodiment is used in a car lamp, the lighting device 500 is not limited to such a configuration, and may be applied to a curve portion or a bent portion inside or outside an object for illustration installation, such as a building, equipment, furniture and the like, as a flexible lighting device in a film form. In this case, the outer lens 510 may be a transparent support member or a housing for supporting the optical member or the light source portion.

As set forth above, some embodiments of the present disclosure may provide the optical member capable of implementing optical images having desired shapes by controlling an optical path, an optical width and luminous intensity through a pattern design to create a line shaped beam and using the line shaped beam.

According to some embodiments of the present disclosure, an entire thickness of the optical member in a film form using the line shaped beam or the lighting device using the optical member becomes thinner so that the optical member and the lighting device can be easily utilized in various application products relating to illumination.

According to some embodiments of the present disclosure, the lighting device has flexibility by using the flexible printed circuit board and the resin layer so that a degree of freedom in product design of the lighting device can be improved and reliability can be secured.

According to some embodiments of the present disclosure, in various illumination fields such as general illumination, design illumination, car illumination and the like, optical images having a desired three-dimensional effect and various shapes can be implemented, and the lighting device can be produced in quantity at low costs.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure provides an optical member that can create a line-shaped beam by controlling an optical path, an optical width and luminous intensity through a pattern design and can implement optical images having a desired shape using the line-shaped beam.

Another aspect of embodiments of the present disclosure may provide an optical member using a line shaped beam which enables an entire thickness of a device to become thinner, and a lighting device using the optical member.

A further aspect of embodiments of the present disclosure may provide a lighting device capable of improving a degree of freedom in product design and securing reliability as the light device including a printed circuit board or optical member is configured to have flexibility.

Yet another aspect of embodiments of the present disclosure may provide a lighting device capable of implementing optical images with a three-dimensional effect in various shapes in various illumination fields such as general illumination, design illumination, car illumination and the like.

In order to solve the above problems, according to an aspect of the present disclosure, an optical member may include: a base substrate; multiple patterns sequentially arranged on a first surface of the base substrate and having inclined surfaces with an inclination angle with respect to the first surfaces; and a reflective portion on the base substrate or the multiple patterns, wherein the multiple patterns implement a line shaped beam of a first path crossing at right angles to respective pattern extension directions of the multiple patterns by guiding a first incident beam into a first surface direction toward which the first surface looks or a second surface direction toward which a second surface of the base substrate opposite to the first surface looks, through refraction or reflection from the inclined surfaces.

In one embodiment, the reflective portion may be provided as a coating layer or a reflective film.

In one embodiment, the optical member may further include reflective patterns on the reflective film, adhesive patterns or a combination thereof.

In one embodiment, a material of the reflective portion may include any one of Ag, Al, $TiO_2$, $CaCO_3$, $BaSO_4$, $Al_2O_3$, silicon, polystyrene (PS), and a white sheet.

According to another aspect of the present disclosure, a lighting device may include an optical member of any one of the aforesaid embodiments and a light source portion irradiating light to the optical member.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
a circuit board;
a plurality of light sources disposed on the circuit board;
an optical member disposed on the circuit board; and
a reflective portion disposed between the circuit board and the optical member,
wherein the optical member comprises;
a base substrate including a first surface facing the circuit board; and
a pattern layer including a plurality of patterns sequentially arranged on the first surface of the base substrate in a first direction and a plurality of separation portions disposed between adjacent ones of the plurality of patterns,
wherein a width of each of the separation portions is smaller than a width of each of the patterns,
wherein the plurality of patterns implement a line shaped beam crossing at right angles to respective pattern extension directions of the plurality of patterns by guiding a first incident beam,
wherein an optical width of the line shaped beam is smaller than a width of a light emitting surface of a light source irradiating light to the multiple patterns, and a length of the line shaped beam is larger than the optical width, and
wherein the plurality of patterns serve as indirect light sources in which optical paths become longer in order as a distance from light sources increases, thereby creating a three-dimensional effect beam in a thickness direction of the base substrate.

2. The lighting device of claim 1, wherein a reflective portion disposed directly on the plurality of patterns so that the reflective portion includes a shape corresponding to a shape of the plurality of patterns.

3. The lighting device of claim 1, wherein the plurality of patterns has a circular or elliptic shape and each of the separation portions has a flat surface.

4. The lighting device of claim 1, wherein the pattern extension directions of the plurality of patterns are parallel to each other or cross each other, and when the pattern extension directions cross each other, the first path is bent with a curvature to a side in which the pattern extension directions cross each other.

5. The lighting device of claim 1, wherein the plurality of light sources penetrates the reflective portion to connect to the circuit board and embedded in the optical member.

6. The lighting device of claim 1, wherein the base substrate is a light guide portion for guiding an incident beam into the inside.

7. The lighting device of claim 1, wherein the reflective portion includes a plurality of holes.

8. The lighting device of claim 7, wherein each of the holes has a shape of at least one of a polygonal shape, a circular shape, an elliptical shape, a star-like shape, a winding ring-like shape, a stripe shape, a mesh shape.

9. The lighting device of claim 1, wherein the plurality of patterns are provided by removing a part of the first surface, or are provided by a pattern layer bonded to the first surface of the base substrate.

10. The lighting device of claim 1, wherein the plurality of patterns comprise: first patterns sequentially arranged and having a first optical path from the light sources; second patterns having a second optical path longer than the first optical path; and third patterns having a third optical path longer than the second optical path, wherein a second distance from a second dummy light source of the light source by inclined surfaces of the second patterns to inclined surfaces of the first patterns is longer than a first distance from a first dummy light source of the light source by the inclined surfaces of the first patterns to the inclined surfaces of the first patterns and is shorter than a third distance from a third dummy light source of the light source by inclined surfaces of the third patterns to the inclined surfaces of the first patterns.

11. The lighting device of claim 1, wherein the plurality of patterns implement a line shaped beam displayed by traveling along the pattern extension directions in a direction opposite to a movement direction of a standard point or an observing point according to movement of the standard point or the observing point.

12. The lighting device of claim 1, wherein the plurality of light sources comprises a first light source and a second light source, wherein the first light source and the second light source irradiate the light to the same direction or irradiate the light from the same direction to directions crossing each other.

13. The lighting device of claim 1, wherein the plurality of light sources comprises a first light source and a second light source, where the first light source and the second light source irradiate the light to opposite directions, or irradiate the light to different directions having an angle of more than 90° and less than 180° between the first light source and the second light source.

14. The lighting device of claim 1, further comprising a base member disposed on the optical member and covering the plurality of light sources, wherein the optical member includes the plurality of patterns facing the substrate, and the substrate has a refractive index that is lower than a refractive index of the patterns.

15. The optical member of claim 1, wherein a distance between two adjacent patterns among the plurality of patterns ranges from 10 to 500 µm.

16. The lighting device of claim 1, wherein a rate of a height to a width (h/w) of the plurality of patterns is 0.5 or less.

17. The lighting device of claim 1, wherein the reflective portion is provided as a coating layer or a reflective film.

18. The lighting device of claim 17, further comprising adhesive patterns formed on an adhesive layer.

* * * * *